(12) United States Patent
Qureshi et al.

(10) Patent No.: US 7,782,882 B2
(45) Date of Patent: Aug. 24, 2010

(54) METHOD AND APPARATUS FOR DISTRIBUTING DYNAMIC AUTO-SUMMARIZATION OF INTERNET PROTOCOL REACHABLE ADDRESSES

(75) Inventors: Muhammad Akber Qureshi, Irvine, CA (US); David Brian Lofquist, Yorba Linda, CA (US)

(73) Assignee: The Boeing Company, Chicago, IL (US)

( * ) Notice: Subject to any disclaimer, the term of this patent is extended or adjusted under 35 U.S.C. 154(b) by 443 days.

(21) Appl. No.: 11/856,334

(22) Filed: Sep. 17, 2007

(65) Prior Publication Data

US 2009/0073994 A1  Mar. 19, 2009

(51) Int. Cl.
*H04J 1/16* (2006.01)
*H04L 12/56* (2006.01)

(52) U.S. Cl. .................. 370/401; 370/252; 370/254; 370/315

(58) Field of Classification Search .............. 370/252, 370/254, 315, 389, 400, 401
See application file for complete search history.

(56) References Cited

U.S. PATENT DOCUMENTS

| | | | |
|---|---|---|---|
| 7,606,160 B2 | 10/2009 | Klinker et al. | |
| 2003/0142682 A1 | 7/2003 | Bressoud et al. | |
| 2005/0175341 A1* | 8/2005 | Ovadia | 398/43 |
| 2007/0008949 A1 | 1/2007 | Balandin | |
| 2007/0070959 A1 | 3/2007 | Almeroth et al. | |
| 2009/0073993 A1 | 3/2009 | Qureshi et al. | |
| 2009/0254572 A1* | 10/2009 | Redlich et al. | 707/10 |

FOREIGN PATENT DOCUMENTS

| | | |
|---|---|---|
| EP | 1511220 A2 | 2/2005 |
| WO | 2006046261 A1 | 5/2006 |

OTHER PUBLICATIONS

Rekhter et al., "A Boarder Gateway Protocol 4 (BGP-4)", Internet Engineering Task Force, Mar. 1, 1995, pp. 1-58.
Moy, "OSPF Version 2" The Internet Society, 1998, RFC 2328, pp. 1-244.
USPTO Notice of allowance for U.S. Appl. No. 11/856,305 dated Mar. 15, 2010.

* cited by examiner

*Primary Examiner*—John Pezzlo
(74) *Attorney, Agent, or Firm*—Yee & Associates, P.C.; John A. Lepore

(57) ABSTRACT

A computer implemented method, apparatus, and computer usable program code for managing addresses in a network. In one advantageous embodiment, a computer implemented method is used to managing addresses for a plurality of destinations in a network. Addresses assigned to a plurality of gateways are summarized to form summarized addresses containing prefixes and addresses for the plurality of gateways in which each gateway in the plurality of gateways is associated with a portion of the prefixes and addresses for destinations handled by the each gateway in the plurality of gateways. A gateway in the plurality of gateways having a largest portion of the summarized addresses is assigned a prefix for all addresses assigned to the network to form a selected gateway. An associated portion of the summarized addresses for the selected gateway is replaced with the prefix.

25 Claims, 24 Drawing Sheets

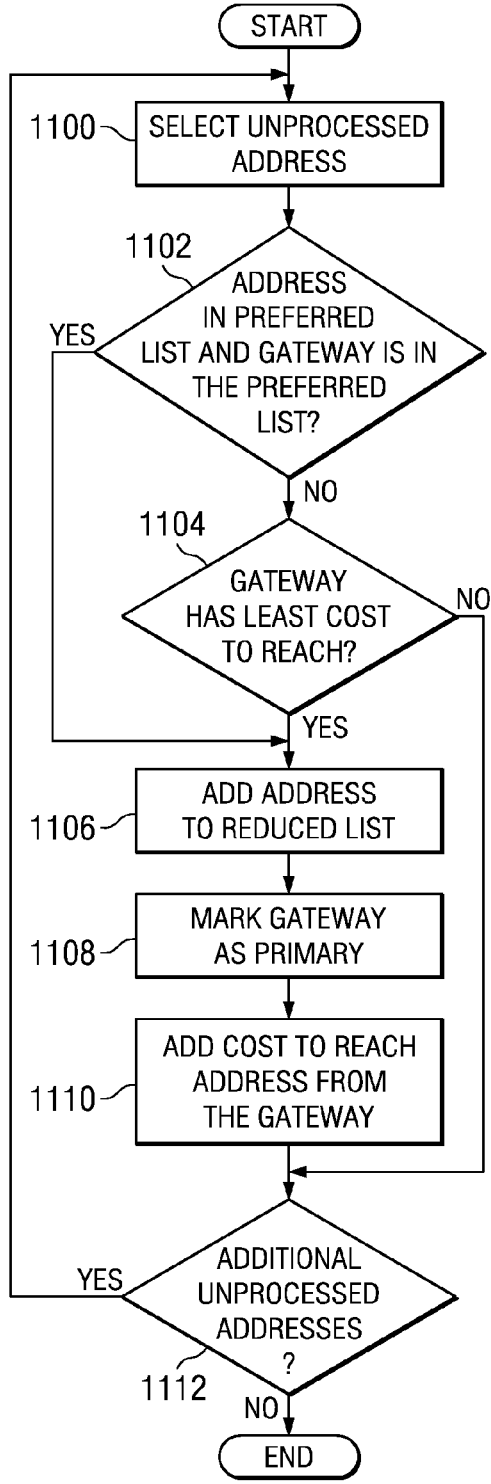
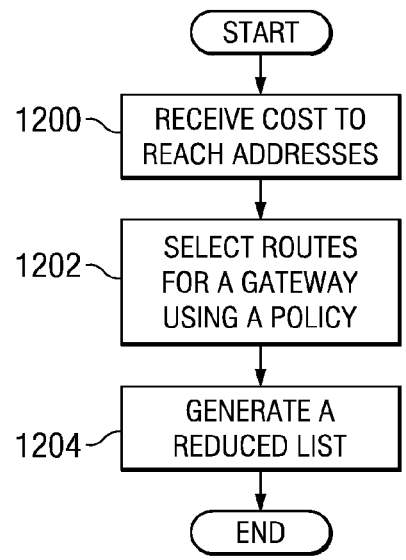
FIG. 11
FIG. 12

FIG. 17B

Functional Algorithm:

/* Local Summarization */
For each ASBR (X) in Area_ASBR list:
  -Create initial Local_Sum_List[X], a replica of the Reduced_List[X]
  -For each i, where i is the mask length starting from 31 to ( AS_Prefix_Len + 1 ):
    -For each prefix of length i :
      -If all addresses within the corresponding prefix are in the Local_Sum_List[X]
        -Replace these addresses with the prefix in the Local_Sum_List[X]
    -For the prefix of length AS_Prefix_Len matching the first AS_Prefix_Len bits of the AS addresses
      -If all addresses within the prefix are in the Local_Sum_List[X]
        -Replace these addresses with the prefix in the Local_Sum_List[X]     ⎫
                                                                              ⎬ 1706
                                                                              ⎭

/* Choosing the best ASBR for advertisement of AS prefix, second level */
For the prefix of length AS_Prefix_Len matching the first AS_Prefix_Len bits of the AS addresses:
  -Find A , the number of active addresses in that prefix using the Active_List
  -Find B , the number of addresses in the prefix using the RA_List
  -If ( A = = B )      /* This is true when there is no segmentation in Configuration Approach 1 */
    -thirdSum_flag = 1
  -Else if ( A > B )  /* Segmentation can create this condition for Configuration Approach 1 and in approach 2 this
                        can happen without any segmentation as ASBRs local to other areas will be responsible for advertising addresses in
                        those areas */
    -If ( (A - B) < 0.5 ) thirdSum_flag = 1
    -Else thirdSum_flag=0
  -Else Error conditions: should never happen                                 ⎫
                                                                              ⎬ 1708
                                                                              ⎭

FROM FIG. 17B

Functional Algorithm: (continued)

1708 {
-Copy the Local_Sum_List to Final_Sum_List
-If ( thirdSum_flag == 1 )
 -For each ASBR (X) in the Area_ASBR list:
  -Calculate Num[X] the number of addresses covered by the prefix in Local_Sum_List[X]:
  -If there is one ASBR (say X) with the most number of addresses
   -Pick the ASBR (say X) with the largest Num value and the Value is 3 or more:
  -Else if there are more than one ASBR with the same large value:
   -Pick the ASBR (say X) with the smallest RID -Add the AS prefix to the Final_Sum_List[X] and delete other prefixes/addresses
}

1710 {
/* Picking prefixes that can be used (in addition to AS prefix) and the best ASBR for its advertisement, third level*/
For each i, where i is the mask length starting from ( AS_Prefix_Len + 1 ) to 30:
 -For each prefix of length i:
  -Find A, the number of active addresses in that prefix using the Active_List
  -Find B, the number of addresses in the prefix using the RA_List
  -If ( A == B )   /* This is true when there is no segmentation in Configuration Approach 1 */
   -thirdSum_flag = 1
  -Else if ( A > B )
   -If ( (A - B) < 0.5 ) thirdSum_flag = 1
   -Else thirdSum_flag = 0
  -Else Error conditions: should never happen
}

TO FIG. 17D

FROM FIG. 17C

Functional Algorithm: (continued)

-If ( thirdSum_flag==1 )
  -For each ASBR (X) in the Area_ASBR list:
    -Calculate Num[X] the number of addresses covered by the prefix in Local_Sum_List[X]:
    -If there is one ASBR with the largest Num value and the Value is 3 or more:
      -Pick the ASBR (say X) with the most number of addresses
    -Else if there are more than one ASBR with the same large value:
      -Pick the ASBR (say X) with the smallest RID -Add the prefix to the Final_Sum_List[X]
    -Delete the prefixes/addresses in Final_Sum_List[X] that are covered by the prefix
    -For each ASBR (Y) in the Area_ASBR List except ASBR (X):

/* Note a larger prefix assigned to an ASBR for advertisement would delete all
      the addresses covered by that prefix from the Final_Sum_List[Y] and those addresses need
      to be added back */
      -Check if all the addresses covered by the prefix in Local_Sum_List[Y] is already in the
      Final_Sum_List[Y]
      -If (NOT) then add the missing addresses to Final_Sum_List[Y]

1710

1712

Output:
For each ASBR element (X) of Area_ASBR list:
  -Final_Sum_List[X] : A list of summarized prefixes assigned to ASBR (X) after third level auto-
  summarization

*FIG. 17D*

METHOD AND APPARATUS FOR DISTRIBUTING DYNAMIC AUTO-SUMMARIZATION OF INTERNET PROTOCOL REACHABLE ADDRESSES

CROSS REFERENCE TO RELATED APPLICATION

The present disclosure is related to the following patent application: entitled "Method and Apparatus for Network Routing Between a Tactical Network and a Satellite Network", Ser. No. 11/856,305, filed Sep. 17, 2007, assigned to the same assignee, and incorporated herein by reference.

BACKGROUND INFORMATION

1. Field

The present disclosure relates generally to an improved data processing system and in particular to a method and apparatus for routing data between different nodes in a network. Still more particularly, the present disclosure relates to a computer implemented method, apparatus, and computer usable program code for routing data between a tactical network and a satellite network.

2. Background

An ad hoc network is a network that may be dynamically formed along a group of nodes and require no existing structure or pre-configuration. An ad hoc network is dynamic and self organizing in nature. These features make this type of network particularly useful in situations in which rapid network deployments are required. A tactical network is a type of ad hoc network. A tactical network is a collection of nodes deployed in a selected geographic area that can communicate with each other.

A tactical network is typically used by different armed forces for communications in a particular location. A node in a tactical network is a data processing system that facilitates the communication of information. Nodes may be part of or located in vehicles, such as trucks or tanks. Nodes also may be carried by infantry or located on helicopters or other aircraft. These nodes are highly mobile and may frequently move with respect to each other. Nodes may join or leave a tactical network.

Tactical networks typically have limited bandwidth capacity because of the frequency spectrum in which the different nodes operate. The particular frequency spectrum used by tactical networks is based on the need to support unpredictable mobility patterns for different nodes and training requirements over which the tactical network is required to operate. As a result, bandwidth use is an important factor in tactical networks.

Further, tactical networks may be supported by another network that acts as a provider to the tactical network. One example of a provider network is a satellite network. A satellite network may provide connectivity between nodes in a tactical network as well as connectivity between nodes in different tactical networks. Additionally, a satellite network may provide services, such as communications with other networks.

A gateway is a data processing system that provides for communications between a tactical network and another network like a satellite network. Inter-network communications between a satellite network and a tactical network are provided through satellite links. These satellite links terminate in gateways in the tactical network. A gateway is a device that provides for inter-network communications. A feasible inter-network architecture for tactical networks avoids use of scarce bandwidth capacity as much as possible.

This requirement for the most part requires that traffic entering or leaving the tactical network enter or leave from an inter-network gateway that is closest to the end of the host in the tactical network. Traffic is information that is sent into or out of the tactical network. Reach back traffic is traffic entering or leaving the tactical network. Although a satellite network has more capacity or bandwidth than a tactical network, control traffic may reach levels that may cause congestion or slow downs. Control traffic is information that is sent to manage a network. The control traffic may be, for example, routing information sent from the tactical network to the satellite network for use by the satellite network to select routes to destinations within the tactical network.

Another factor that impacts the use of the bandwidth in a tactical network is the number of gateways used for inter-network communications between the tactical network and a satellite network. An increase in the number of gateways reduces the use of the tactical network capacity by reach back traffic. With more gateways, reach back traffic traverses a smaller portion of the tactical network, consuming less network bandwidth.

Although increasing the number of gateways reduces bandwidth usage in some ways, the bandwidth usage can be increased in other ways. For example, the network protocols used by tactical networks for communications within a tactical network, as well as inter-network communications with other networks, may result in performance issues and bandwidth usage.

The currently used protocols for inter-network communications were developed by the Internet community assuming a presence of abundantly available bandwidth and stable wired networks. For example, border gateway protocol (BGP) is a core routing protocol of the Internet that is used in tactical networks. This type of protocol maintains a table of IP networks or prefixes which designate network reachability among autonomous systems (AS).

The border gateway protocol may be used to exchange routing information between different gateways. The routing table maintained by each gateway contains a list of known routers where other gateways that can be reached as well as cost metric associated with a path to each router. This information is used to choose the best available route to a destination in a tactical network.

Currently, each gateway advertises all reachable addresses in the tactical network along with the cost of reaching those addresses from the gateway itself. A reachable address is an address from which a communication can be sent or received. Additionally, each gateway sends an update of an address when a gateway sees the cost of reaching the gateway from itself changing.

Every time the cost of reaching the address changes, the gateway re-advertises the address even if the gateway is not the selected point for that address into the tactical network. As a result, the frequency of updates increases as well as the number of addresses that are updated after a node changes position.

Currently, the different gateways in a tactical network pass all relevant routing information for the tactical network to the satellite network to make the necessary decisions regarding what routes to use in the tactical network. Sending this information from the gateways to the satellite network uses large amounts of bandwidth. Also, the frequency of updates adds to the consumption of bandwidth. For example, a satellite network may support numerous gateways, such as one hundred and thirty. As a result, bandwidth usage increases with all of these gateways passing information for making routing decisions to a satellite network.

Therefore, it would be advantageous to have an improved method, apparatus, and computer usable program code to reduce bandwidth usage in networks, such as tactical networks.

SUMMARY

The advantageous embodiments provide a computer implemented method, apparatus, and computer usable program code for managing addresses in a network. In one advantageous embodiment, a computer implemented method is used to managing addresses for a plurality of destinations in a network. Addresses assigned to a plurality of gateways are summarized to form summarized addresses containing prefixes and addresses for the plurality of gateways in which each gateway in the plurality of gateways is associated with a portion of the prefixes and addresses for destinations handled by the each gateway in the plurality of gateways. A gateway in the plurality of gateways having a largest portion of the summarized addresses is assigned a prefix for all addresses assigned to the network to form a selected gateway. An associated portion of the summarized addresses for the selected gateway is replaced with the prefix.

In another advantageous embodiment, a computer implemented method manages addresses. The addresses are vertically summarized dynamically for a plurality of gateways in a network while the network is active to form a set of prefixes and addresses. The set of prefixes and addresses is horizontally summarizing to form a summarized set of addresses. The summarized set of addresses is sent to another network. The summarized set of addresses are used to select a gateway for use in directing traffic to a selected destination.

In yet another advantageous embodiment, a computer program product is used for managing addresses for a plurality of destinations in a network. The computer program product comprises a computer readable medium and program code. The program code includes program code stored on the computer readable medium for summarizing addresses assigned to a plurality of gateways to form summarized addresses containing prefixes and addresses for the plurality of gateways in which each gateway in the plurality of gateways is associated with a portion of the prefixes and addresses for destinations handled by the each gateway in the plurality of gateways. Program code stored on the computer readable medium is present for assigning a gateway in the plurality of gateways having a largest portion of the summarized addresses a prefix for all addresses assigned to the network to form a selected gateway. Program code stored on the computer readable medium is present for replacing an associated portion of the summarized addresses for the selected gateway with the prefix.

In different advantageous embodiment, a computer program product is used for managing addresses. The computer program product comprises a computer readable media and program code. The program code includes program code stored on the computer readable medium for vertically summarizing addresses dynamically for a plurality of gateways in a network while the network is active to form a set of prefixes and addresses. Program code stored on the computer readable medium is present for horizontally summarizing the set of prefixes and addresses to form a summarized set of addresses. Program code stored on the computer readable medium is used for sending the summarized set of addresses to another network, wherein the summarized set of addresses are used to select a gateway for use in directing traffic to a selected destination.

In a further advantageous embodiment, a network data processing system comprising a plurality of destinations and a plurality of gateways. The plurality of gateways vertically summarizes addresses for the plurality of destinations dynamically for the plurality of gateways in a network within the network data processing system while the network is active to form a set of prefixes and addresses; horizontally summarizes the set of prefixes and addresses to form a summarized set of addresses; and sending the summarized set of addresses to another network within the network data processing system, wherein the set of summarized addresses are used to select a gateway for use in directing traffic to the a selected destination.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present disclosure when read in conjunction with the accompanying drawings, wherein:

FIG. 11 is a flowchart of a process for selecting routes using a policy in accordance with an advantageous embodiment;

FIG. 12 is a flowchart of a process for selecting routes in accordance with an advantageous embodiment;

FIGS. 17A-17D are diagrams illustrating code for auto summarization in accordance with an advantageous embodiment.

DETAILED DESCRIPTION

Figure 1:
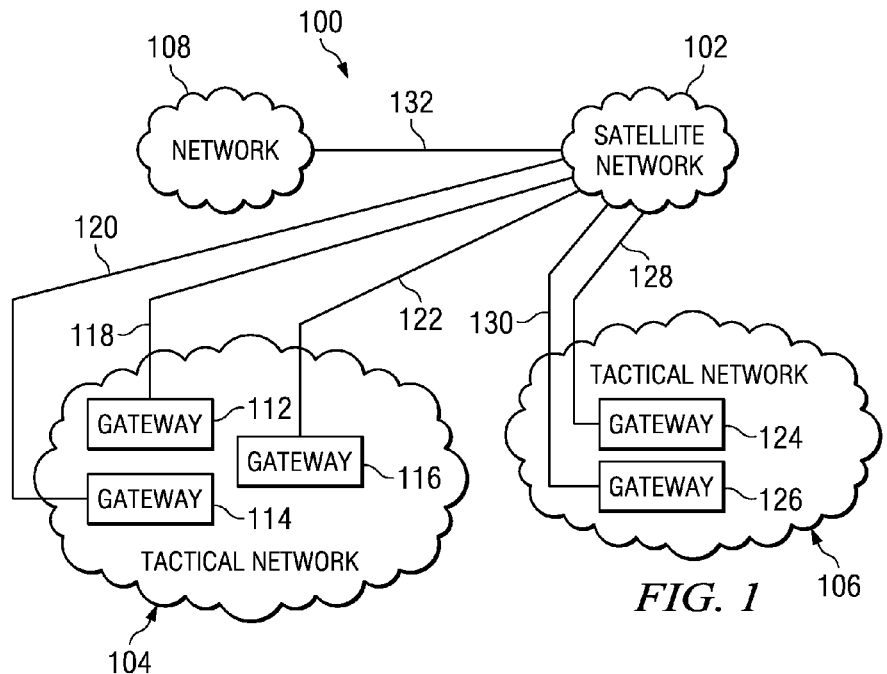
FIG. 1 is a diagram of a network data processing system in accordance with an advantageous embodiment.

With reference now to the figures and in particular with reference to FIG. 1, a diagram of a network data processing system is depicted in accordance with an advantageous embodiment. Within network data processing system 100, satellite network 102, tactical network 104, tactical network 106, and network 108 are present. Satellite network 102 is an upper-tier or provider network with respect to tactical network 104 and tactical network 106. Satellite network 102 provides services to these tactical networks.

Inter-network communications is provided between satellite network 102 and tactical network 104 by gateways 112, 114, and 116 through satellite links 118, 120, and 122. As used herein, a gateway is a device or data processing system that provides inter-network communications. Gateway 124 and gateway 126 in tactical network 106 provide inter-network communications with satellite network 102 through satellite links 128 and 130. In a similar fashion, satellite network 102 communicates with network 108 through communications link 132.

In the depicted examples, Open Shortest Path First (OSPF) protocol is the routing protocol used by tactical networks 104 and 106. Gateways 112, 114, 116, 124, and 126 also participate in Open Shortest Path First routing in their respective networks. The Open Shortest Path First protocol is an example of a link state protocol for routing data in a packet switch network.

Each node in this type of protocol independently calculates the best next hop from it to every possible destination in the network. This process is performed using its link state database, which is a local copy of a connectivity map of the network which is updated by a link state routing protocol. The collection of best next hop is placed in a routing table for this particular node. Every node in this type of protocol receives a connectivity map of network connections. This map is in the form of a graph showing which nodes are connected to other nodes in the network. In these examples, the map takes the form of a link state database.

The different advantageous embodiments recognize that inter-network communications between satellite network 102 and tactical networks 104 and 106 through satellite links 118, 120, 122, 128, and 130 have limited bandwidth, and the amount of bandwidth may vary if some of these links become unavailable because of different conditions. These conditions may include, for example, weather conditions that reduces the bandwidth or causes a satellite link to become unavailable.

The different advantageous embodiments are described with respect to the Open Shortest Path First protocol to provide a particular example. These examples are not meant to limit the manner in which different advantageous embodiments may be implemented. For example, other link state protocols may be used to implement one or more different features of the different advantageous embodiments. In one example, Intermediate System to Intermediate System (IS-IS) is an example of another protocol that may be used to implement different features.

Further, other advantageous embodiments may be implemented using non-link state protocols. With these types of embodiments, mechanisms or processes may be added to obtain topology information about a network to provide information found in a link state database for use by the different processes in these examples.

Figure 2:
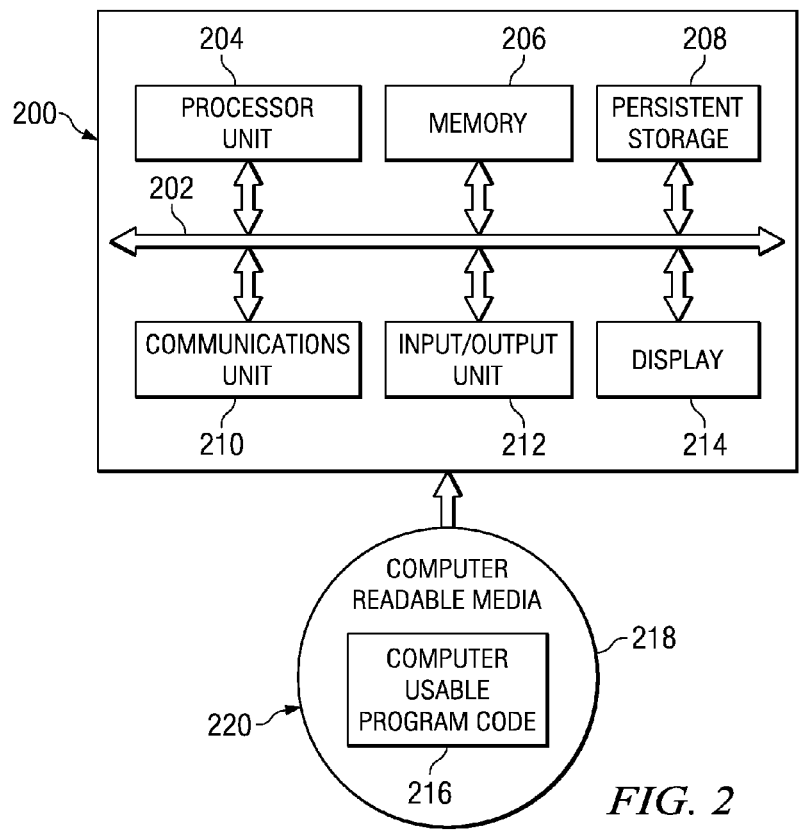
FIG. 2 is a diagram of a data processing system in accordance with an advantageous embodiment.

Turning now to FIG. 2, a diagram of a data processing system is depicted in accordance with an advantageous embodiment. Data processing system 200 is an example of a data processing system that may be used to implement gateways, such as gateways 112, 114, 116, 124, and 126 in FIG. 1. This data processing system may execute processes used to reduce the amount of bandwidth consumed by tactical networks 104 and 106 as well as reducing the bandwidth used in future network communications between tactical networks 104 and 106 and satellite network 102. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multiprocessor system containing multiple processors of the same type.

Memory 206, in these examples, may be, for example, a random access memory. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize that the current approach for transmitting information regarding changes in networks and making routing decisions may be reasonable in some environments. In a tactical environment, however, this approach does not scale well. The high mobility within tactical networks also makes summarization of addresses infeasible with current processes or techniques.

The different advantageous embodiments also recognize that a large number of routes are present in the tactical network that cannot be summarized in the planning or set-up stage because of high mobility using existing summarization techniques and limited bandwidth constraints. This situation makes existing techniques for controlling the gateways that various tactical network bound traffic must use unscalable. Traffic includes, for example, data and voice communications. The data may include, for example, maps, coordinates or location information for use by the tactical network.

The different advantageous embodiments also recognized frequent blockage of satellite links may occur. When satellite links are blocked, the traffic increases on the remaining satellite links. Further, when a satellite link is repaired, the control traffic on the repaired link may be large while a peer relationship is reestablished between a gateway in a tactical network and the satellite network. The control traffic is the routing information that may be passed to the satellite network. In these examples, traffic includes any data or communications that may be sent.

With these and other issues associated with high mobility of nodes and limited bandwidth, the different advantageous embodiments provide a computer implemented method, apparatus, and computer usable program code for routing information in a network. Processing information is processed in a first network with the processed routing information being sent to a second network for use in inter-network communications between the first network and the second network. In these examples, the first network may be a tactical network, and the second network may be a satellite network. In another example, the first network and the second network may be sub-networks within a network. As used herein, a computer implemented method may be any process or steps that are executed by a processor in a computing device, such as data processing system 200. This data processing system may be, for example, a computer, a router, a communications device, or any other device in which a processor capable if executing instructions or program code is present.

The first network identifies routes to reach addresses in the first network and sends the routes to the second network. This process, in different embodiments, is in contrast to the current mechanisms in which all information about the first network is sent to the second network. In this approach, the second network identifies routes for use in inter-network communications. By sending all of the information from each gateway to the second network, increased bandwidth is used. Additionally, the increased use of resources of the gateways to transmit this information also is used within the first network.

By only transmitting routes that each gateway handles, the amount of traffic between the first and second network is reduced. Further, the amount of processing resources used to transmit data from the first network to the second network also is reduced because each gateway in the first network only sends or advertises routes that this particular gateway handles for particular destinations in the first network.

In one embodiment, updates to routing information are collected in a tactical network. Responsive to an event, a cost of reaching each address in the tactical network is identified from each of a plurality of gateways in the tactical network that have access to a satellite network to form identified costs. An address is associated with the node and is used to send or exchange communications with a particular node. In these examples, each node within a network is provided with a unique address.

A set of addresses are selected for a set of gateways providing access to the satellite network in which each gateway in the set of gateways is identified using a policy with respect to a cost of reaching a particular address in the tactical network to form an update list. The term "a set", when used in the disclosure, refers to one or more. For example, a set of addresses is one or more addresses. The update list is sent to the satellite network. The satellite network uses this update list to perform routing of communications into the tactical network.

In some advantageous embodiments, summarization of addresses for a network, such as a tactical network, is performed dynamically while the network is active. The summarization performed in these different advantageous embodiments may include multiple levels of summarization. A first level of summarization may be performed to identify multiple levels of summarization. A first level of summarization may be performed to identify a list of prefixes for each gateway. This type of summarization is also referred to as a vertical summarization.

Additionally, another summarization may be performed to select a single gateway within the network to broadcast a prefix for the Internet protocol address range assigned to the network. This type of summarization is referred to as a horizontal summarization. Additional summarizations may be performed to add prefixes to other gateways in a manner that reduces the number of addresses broadcast or sent by the tactical network to another network for routing traffic to destinations within the network. This type of summarization is also referred to as a horizontal summarization. In this manner, the amount of information that is required to be sent to another network for providing routing may be reduced.

In this manner, a reduction in traffic from the network in which the gateways are located to another network may be reduced. As a result, additional bandwidth may be available for other traffic. This compact list of prefixes is a reduced form of the set of addresses. The compact list of prefixes may be compared with a prior set of prefixes to identify new updates for the update list. These different processes may be implemented within a gateway.

Further, summarization of prefixes may occur in a manner to select a particular gateway to broadcast a prefix for the tactical network. Further, additional prefixes may be identified through summarization in addition to that in the tactical network along with the best gateway to advertise these other prefixes.

In these examples, a smart agent is located on each gateway providing inter-network communications between networks. All of the reachable destinations in a network are partitioned or grouped into subsets. As a result, each gateway broadcasts or sends a list of addresses for which that gateway will perform routing. The gateway may be selected to perform the routing based on a set of criteria or a policy. As a result, the amount of bandwidth used in transmitting this type of information is reduced because each gateway no longer transmits all of the addresses to the satellite network.

Further, the routing decisions are now made by the smart agents rather than allowing the satellite network to decide which gateways to use to reach different destinations. As a result, the gateways process all of the of the information need for routing traffic to destination within the tactical network in illustrative examples. The satellite network is provided with this information and does need receive all information about the state of tactical network to decide how to route traffic to destinations within the tactical network.

Figure 3:
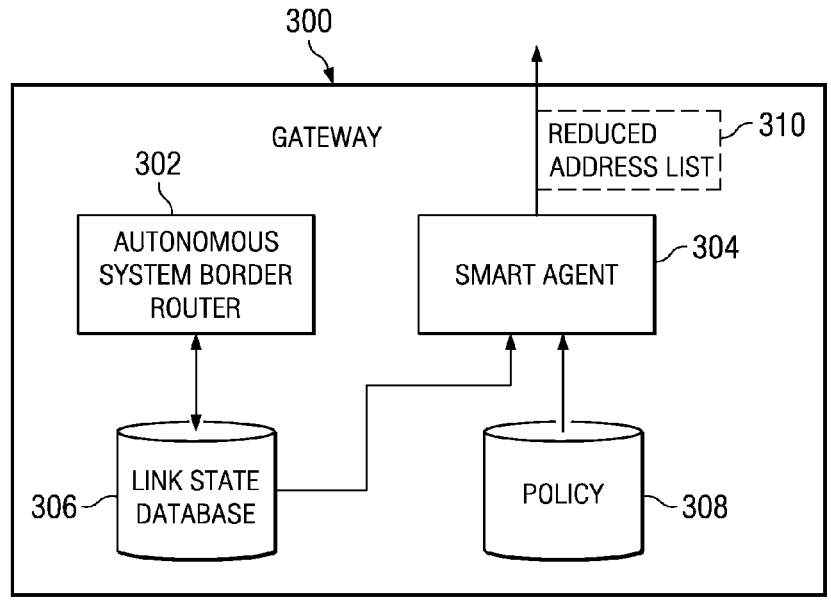
FIG. 3 is a block diagram of a gateway in accordance with an advantageous embodiment.

Turning now to FIG. 3, a block diagram of a gateway is depicted in accordance with an advantageous embodiment. Gateway 300 is an example of a gateway, such as gateway 112 or gateway 124 in FIG. 1. Gateway 300 may be implemented using a data processing system, such as data processing system 200 in FIG. 2. Gateway 300 contains autonomous system border router 302 and smart agent 304. Autonomous system border router 302 is a process used in gateway 300 to provide inter-network communications.

Autonomous system border router 302 performs routing in gateway 300 for inter-network communications, such as between a satellite network and a tactical network. In other words, autonomous system border router 302 is a routing process. Autonomous system border router 302 uses link state database 306 to route traffic to different nodes within the network in which gateway 300 is located. In these examples, link state database 306 is constructed as a tree image of the network topology. This database shows an arrangement of mapping of an element in a network. These elements include the nodes and the connections between the nodes in these examples. This database is present in gateways using Open Shortest Path First protocol.

In these examples, smart agent 304 uses link state database 306 to select routes for autonomous system border router 302 to advertise to the satellite network. In contrast to advertising a list of all addresses reachable within the tactical network, smart agent 304 identifies a subset of routes that are to be handled by autonomous system boarder router 302 in gateway 300. A route, in these examples, is an identification of a destination within the network and the gateway that provides access to that particular destination. In these examples, the identification is made with an address for the destination.

In these examples, the list only includes the addresses. The gateway used to route the traffic to the destination on the list is the gateway that sends or broadcasts the list. In other embodiments, the list also may include an identification of the gateway for use in routing the traffic to a particular destination.

Smart agent 304 selects a portion of the destinations within the tactical network for gateway 300. Smart agent 304 uses policy 308 to identify addresses of destinations for which gateway 300 is the preferred gateway to reach the addresses. In other words, smart agent 304 identifies routes that will be used by the satellite network to send data to different nodes in the tactical network. The addresses for the selected set of routes identifying gateway 300 as the preferred entry point for the network forms reduced address list 310.

Autonomous system border router 302 sends link state advertisements to the satellite network using reduced address list 310. These advertisements are information identifying the destinations that gateway 300 can receive traffic from the satellite network for routing traffic to destinations in the tactical network. In some cases, some routes may be duplicated to provide a backup in case of a failure of a gateway.

Figure 4:
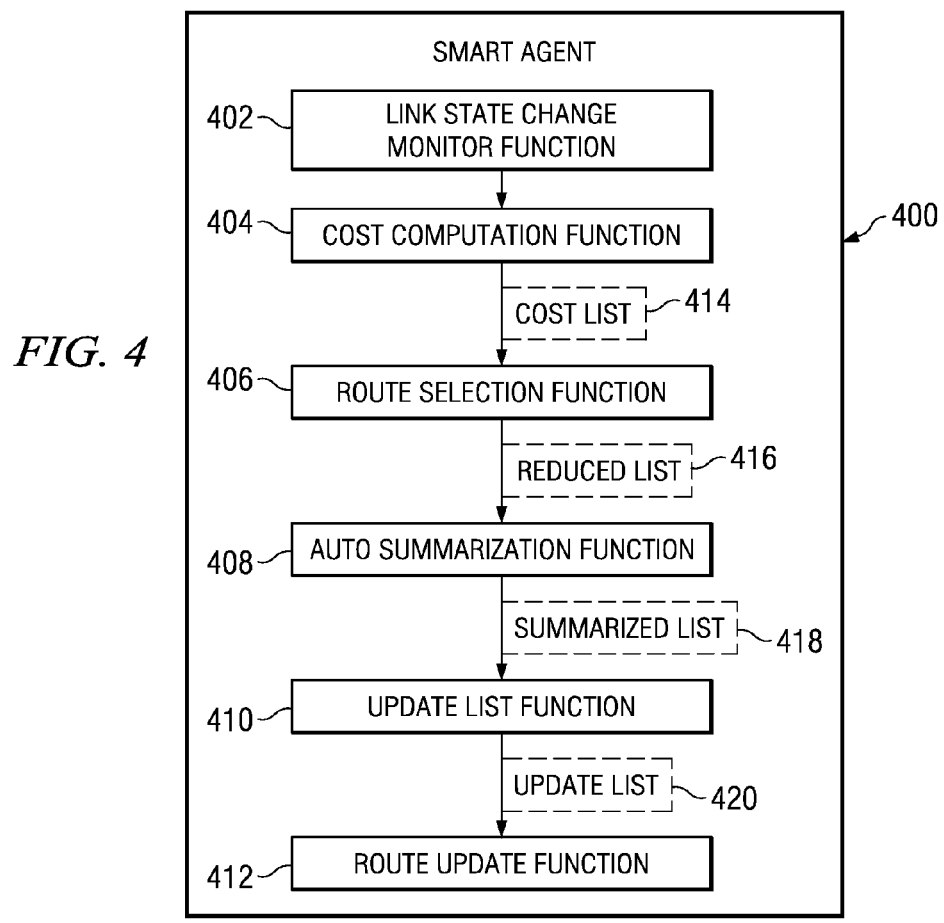
FIG. 4 is a diagram of a smart agent in accordance with an advantageous embodiment.

Turning now to FIG. 4, a diagram of a smart agent is depicted in accordance with an advantageous embodiment. In these examples, smart agent 400 includes a number of different functions. For example, some of the functions that may be found in smart agent 400 include link state change monitor function 402, cost computation function 404, route selection function 406, auto summarization function 408, update list function 410, and route update function 412.

Link state change monitor function 402 is used to collect routing updates in the tactical network. Link state change monitor function 402 may compare a prior copy of the link state database with the current copy of this database to see if changes have been made. The cost to reach different nodes may change because nodes may have moved within the tactical network.

Cost computation function 404 is used to update the cost of reaching any destination address from each gateway. In other words, cost computation function 404 creates a list of all addresses and the cost of reaching each address from all of the gateways. In other words, each address will have a cost to reach that address for each gateway that is present in a particular network. The identification of the gateway is made using a link state database. This information is placed into cost list 414 and passed through route selection function 406.

Route selection function 406 identifies which gateways should advertise which routes using cost list 414. For recovery performance, a route can be advertised from multiple gateways. In this case, one gateway advertises the primary route. This gateway is the one that provides the lowest cost for reaching a particular destination. In these examples, the destinations are identified with IP addresses. A gateway with the second highest cost can also advertise the same route to provide a backup. This same approach for route selection may be extended to provide possible load balancing. In some embodiments, each of the gateways is selected to provide load balancing based on a policy. The policy may be, for example, without limitation, selecting the routes based on a lowest cost to reach a destination.

In these examples, route selection function 406 generates reduced list 416, which contains a list of routes for each gateway that has been selected to advertise into the satellite network to specify which gateway should be used to route an incoming traffic flow to reach a destination in the tactical network.

Auto summarization function 408 provides a compact list of prefixes that is sufficient to achieve the desired routing. Auto summarization function 408 may be implemented using various algorithms to cover different scenarios in levels of possible optimization.

In these examples, auto summarization function 408 performs three levels of summarization. This function receives a list of addresses that have been assigned as well as an identification of unassigned addresses. For example, a list of address ranges that are present and a list of assigned addresses may be used to determine both assigned and unassigned addresses. The selected routes are then also used along with this information to summarize the routes. Auto summarization function 408 may use fewer bits to reach the desired addresses, depending on what addresses are used and unused. For example, multiple network address ranges may be combined in an effort to perform routing to smaller prefixes or less specific prefixes.

A prefix is a number that specifies how many addresses it covers an IP addressing system. A prefix size defines the number of initial bits that are fixed in an address. An IP prefix specifies how many initial bits of an IP address are fixed. The remaining bits of the 32 bit IP V4 address are considered "do not care", which means it does not matter whether any of the remaining bits has a value of 1 or 0. The prefix identifies all of the 32 bit address that can be constructed by using the value identified in initial fixed bits and any combination of 1 or 0 values in the remaining bits.

For example, if you have a 31 bit prefix, the last bit can be set as "do not care". In this example, the first 31 bits of the prefix are fixed and the last bit can be a 0 or 1. As a result, two addresses are packed into this 31 bit prefix address bit. A 31 bit prefix with different values in the first 31 bits identifies another bit. Similarly, a 30 bit pre-fix with the first 30 bits fixed allows any values of 1 and 0 in the $31^{st}$ and $32^{nd}$ bit, thus creating a bin of 4 32 bit addresses. A thirty bit address prefix is a smaller or less specific prefix compared to a 31 bit prefix, which has the same first 30 bits as in the 30 bit prefix.

The summarization process, in the different embodiments, performs this type of summarizing or aggregation of addresses based on used and unused addresses locally for each gateway. Thereafter, auto summarization function 408 also may perform a second level of summarization in which a best gateway is selected to advertise the prefix for or address range assigned to the tactical network. In this example, the tactical network is the autonomous system. Further, in these examples, the gateway with the most number of addresses is selected. This gateway is selected to advertise the prefix corresponding to the address range assigned to the tactical network. The selected gateway only advertises this prefix and not any other addresses covered by the prefix, in these examples.

Next, auto summarization function 408 may perform a third level of summarization. In this third level of summarization, additional prefixes are identified that may be used in addition to the autonomous system prefix. A best gateway also is selected to advertise this prefix. As a result, auto summarization function 408 generates a list of summarized prefixes that are assigned to the gateway in which smart agent 400 is located.

Update list function 410 identifies what updates are to be sent by a gateway using summarized list 418. These updates may include new advertisements as well as withdrawals. This function may compare the output from auto summarization function 408 to prior iterations or outputs by auto summarization function 408 to identify what new updates may need to be sent. The output of update list function 410 is update list 420.

Update list 420, in one example, is a list of all of the routes handled by the gateway on which smart agent 400 is located. Update list 420 also may be an incremental update list containing only changes from the previous version of update list 420. Incremental updates may be included in update list 420 if the required updates are numerous. In other words, the incremental update only contains the changes from the previous version of update list 420.

Route update function 412 is used to send updates in update list 420 to the routing process in the gateway on which smart agent 400 is located for transmission or advertisement to the satellite network. Alternatively, route update function 412 may send these updates directly to the satellite network.

In this manner, smart agent 400 may reduce the number of gateways through which a route needs to be advertised. Further, smart agent 400 may reduce the number of routes that need to be advertised as well as the frequency of advertisements. As a result, the amount of traffic across communications links between networks may be reduced. Further, the processing resource needed to transfer data from a tactical network to a satellite network also is reduced.

Figure 5:
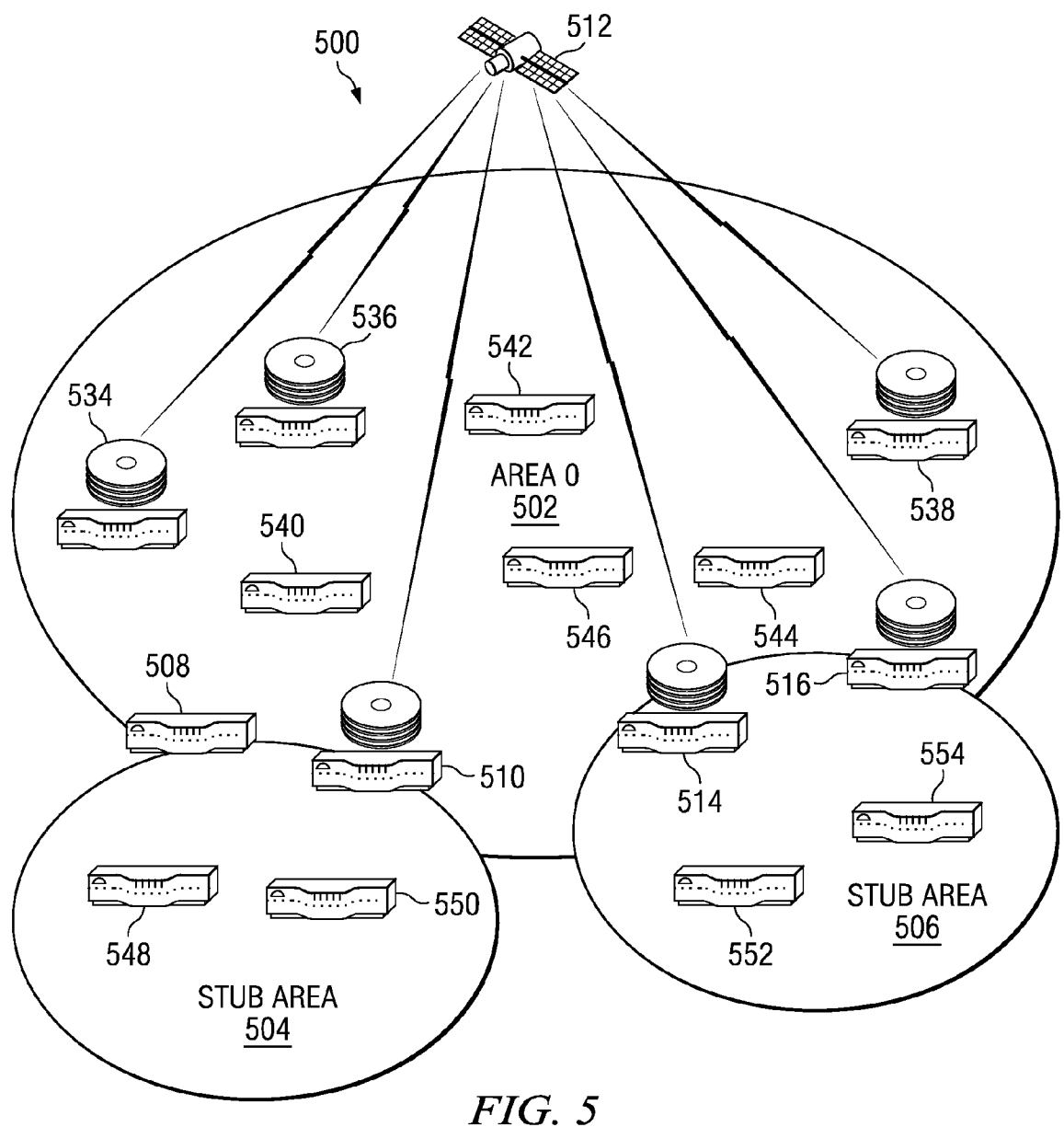
FIG. 5 is a diagram of one configuration for a tactical network in accordance with an advantageous embodiment.

Turning now to FIG. 5, a diagram of one configuration for a tactical network is depicted in accordance with an advantageous embodiment. In this example, tactical network 500 contains backbone area 502 and stub areas 504 and 506. Backbone area 502 is also referred to as area zero and forms the core of tactical network 500 in these examples. All other areas, such as stub area 504 and stub area 506, are connected to backbone area 502. Stub area 504 and stub area 506 are areas that do not receive external routes for inter-network communications.

Stub area 504 is connected to backbone 502 through router 508 and gateway 510. These devices function as area border routers, in these examples, because they provide connection from one area in tactical network 500 to another area in tactical network 500. Additionally, gateway 510 also provides a connection to another autonomous system, satellite 512 in the satellite network for inter-network communications. Gateway 510 provides a function as an area border router as well as an autonomous system border router.

The autonomous system border router function provides communication with another network or autonomous system. An autonomous system is a collection of networks and routes under the control of one entity in these examples. Stub area 506 is connected to backbone area 502 through gateways 514 and 516. In addition, gateways 514 and 516 also provide a connection to satellite 512.

The autonomous system boundary router function occurs because gateway 510 also provides a connection to more than one autonomous system. In this example, the autonomous systems are tactical network 500 and the satellite network in which satellite 512 is located. Gateway 510 provides an exchange of routing information with other routers in other autonomous systems, such as satellite 512.

Gateways 534, 536, and 538 within backbone area 502 function as autonomous system boundary router processes, in these examples. Routers 540, 542, 544, and 546 in backbone area 502 are internal routers and only have connections for relationships with routers within backbone area 502. In a similar fashion, routers 548 and 550 in stub area 504 are internal routers. Routers 552 and 554 in stub area 506 are internal routers in these examples. Although only two stub areas are depicted, other numbers of stub areas may be used, depending on the particular implementation.

Within tactical network 500, each area border router transmits a link state advertisement into its stub area to indicate any address outside of the stub area that may be reachable through the particular area border router. In these examples, a link state advertisement is a communication used to transport a routing topology from a local router to all other local routers in the same area. Nodes within a particular stub area in tactical network 500 select the lowest cost area border router from any source within the stub area.

This type of configuration in tactical network 500 relieves a stub area from carrying any link state advertisements carrying addresses of networks/hosts located in other areas outside of tactical network 500.

Backbone area 502, in these examples, carries all of the link state advertisements carrying addresses of all host networks within the autonomous system, tactical network 500. In this particular embodiment, a focus is made on enhancing backbone area 502 in terms of capacity and connectivity. Additionally, the different area border routers may provide flexible auto summarization in the direction from a stub area, such as stub area 504 to backbone area 502. The different gateways within tactical network 500 may share a common link state database for use by smart agents in the depicted examples.

This type of configuration relieves stub areas from carrying routing information that are external to those areas. Further, the configuration of tactical network 500 may provide optimal routing within an area to reach an external gateway through the configuration of a router as being both a gateway and an area border router for a particular area.

Figure 6:
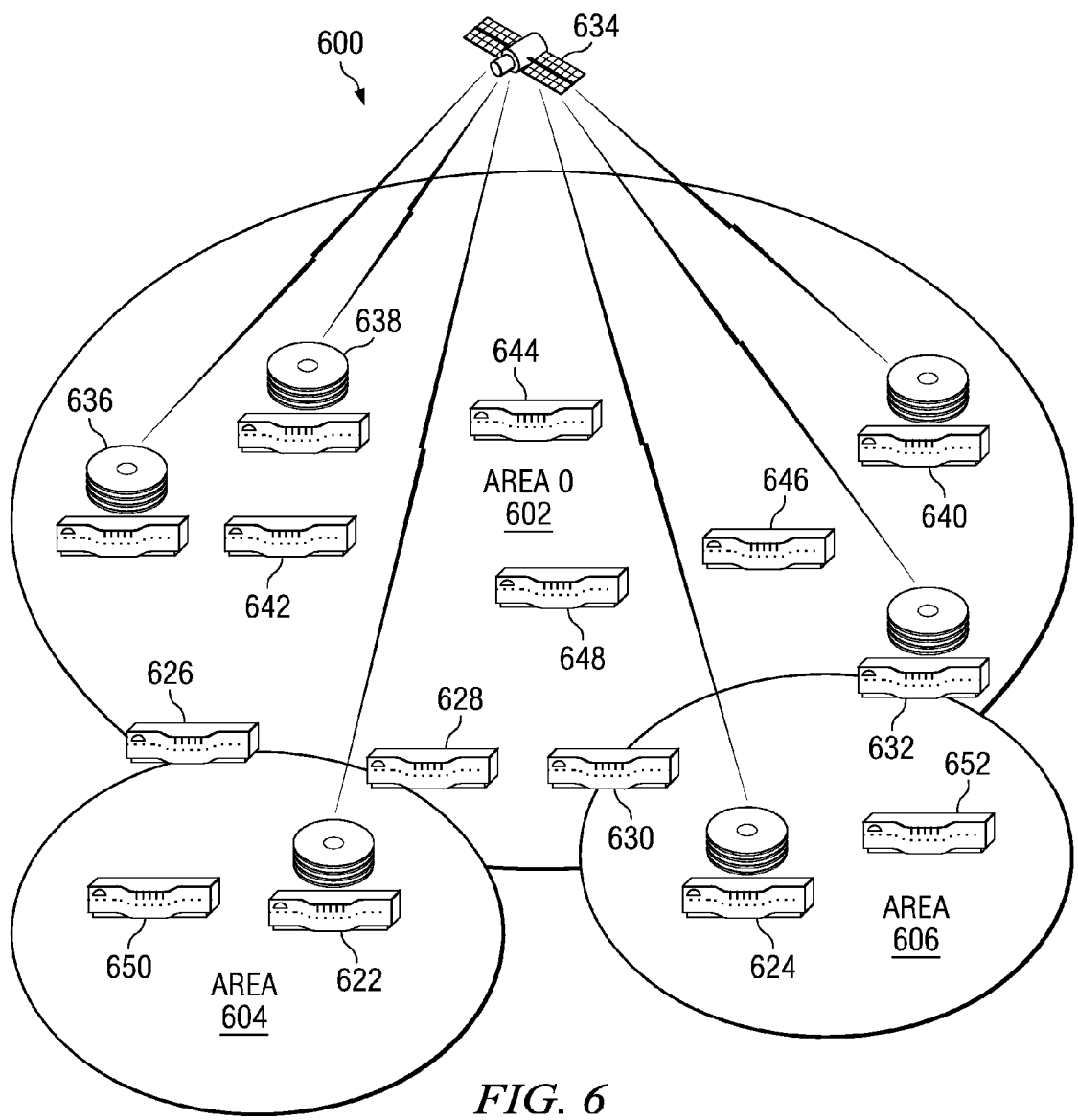
FIG. 6 is a diagram of another configuration for a tactical network in accordance with an advantageous embodiment.

Turning now to FIG. 6, a diagram of another configuration for a tactical network is depicted in accordance with an advantageous embodiment. In this example, tactical network 600 includes backbone area 602 and areas 604 and 606.

Gateway 622 functions as an autonomous system border router and provides an inter-network connection from area 604 to satellite 634. Gateway 624 also functions as an autonomous system border router, providing a connection from area 606 to satellite 634. Routers 626 and 628 function as area border routers providing a connection for area 604 to backbone area 602. Router 630 and gateway 632 provide area border router functions to connect area 606 to backbone area 602. In addition, gateway 632 also provides a function as an autonomous system boundary router to connect area 606 to satellite 634 within a satellite network.

Gateways 636, 638, and 640 function as autonomous system boundary routers providing a connection between backbone area 602 within tactical network 600 to satellite 634. Routers 642, 644, 646, and 648 function as internal routers within backbone area 602. Router 650 within area 604 functions as an internal router. In a similar fashion, router 652 in area 606 is an internal router.

The configuration of tactical network 600 allows area border routers to pass addresses reachable within the area as summary link state advertisements into backbone area 602. In addition, area border routers within tactical network 600 may pass the summary link statement advertisements carrying addresses of hosts/networks and other areas from backbone area 602 into other areas. For example, router 628 functions as an area border router and may pass this type of advertisement from backbone area 602 into area 604. Further, external link state advertisements may be disseminated across all areas within tactical network 600. This layout is in contrast to the configuration to tactical network 500 in FIG. 5 in which external link state advertisements were confined to backbone area 502 within FIG. 5.

The configuration of tactical network 600 forces leaf areas, such as areas 604 and 606 to carry additional routing information. Auto summarization processes are carried out in tactical network 600 in both areas, such as area 604 into backbone area 602 and in the reverse direction from backbone area 602 into area 604.

Figure 7:
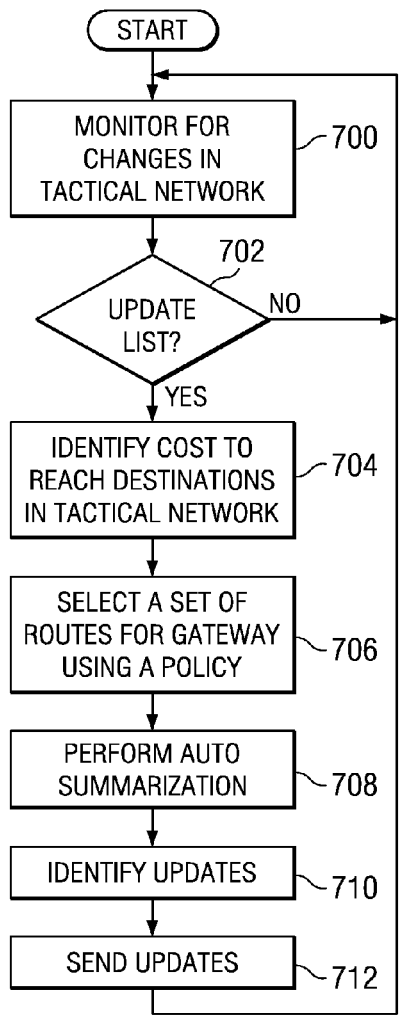
FIG. 7 is a flowchart of a process for updating routes in accordance with an advantageous embodiment.

Turning now to FIG. 7, a flowchart of a process for updating routes is depicted in accordance with an advantageous embodiment. The process illustrated in FIG. 7 may be implemented using a tactical network, such as tactical network 500 in FIG. 5 or tactical network 600 in FIG. 6. In particular, the process illustrated in FIG. 7 may be implemented in a set of smart agents located in these tactical networks. The set of smart agents may be one or more smart agents, depending on the particular implementation.

For example, the process may be implemented in a smart agent, such as smart agent 400 in FIG. 4. More specifically, the process may be implemented in a smart agent executing on a gateway providing inter-network communications between a tactical network and a satellite network.

The process begins by monitoring for changes in the tactical network (operation 700). Thereafter, a determination is made as to whether the list of addresses advertised by a gateway should be updated (operation 702). The determination as to whether to update may be made based on the occurrence of an event. For example, an event may be a periodic event in which the list of routes is updated periodically. The update may include a list of addresses whose advertisement is withdrawn.

Alternatively, the update may occur in response to an event, such as an identified change in the tactical network. Further, these changes may be for a particular node or a particular number of nodes that are added or removed from the tactical network. Of course, other metrics may be used to determine whether to update the list of routes. If an update is not to be performed, the process returns to operation 700 as described above.

Otherwise, the cost to reach destinations in a tactical network is identified (operation 704). This cost is for every destination or node within the tactical network from every gateway in a set of gateways in which the smart agent is executing. Next, a set of routes is selected for the gateway using a policy (operation 706). Thereafter, the process may perform auto summarization to reduce the addresses to a set of prefixes that is sufficient to reach all of the addresses selected for the routes (operation 708). The process identifies updates to be made (operation 710) and then sends the updates (operation 712). Thereafter, the process returns to operation 700 as described above.

Figure 8:
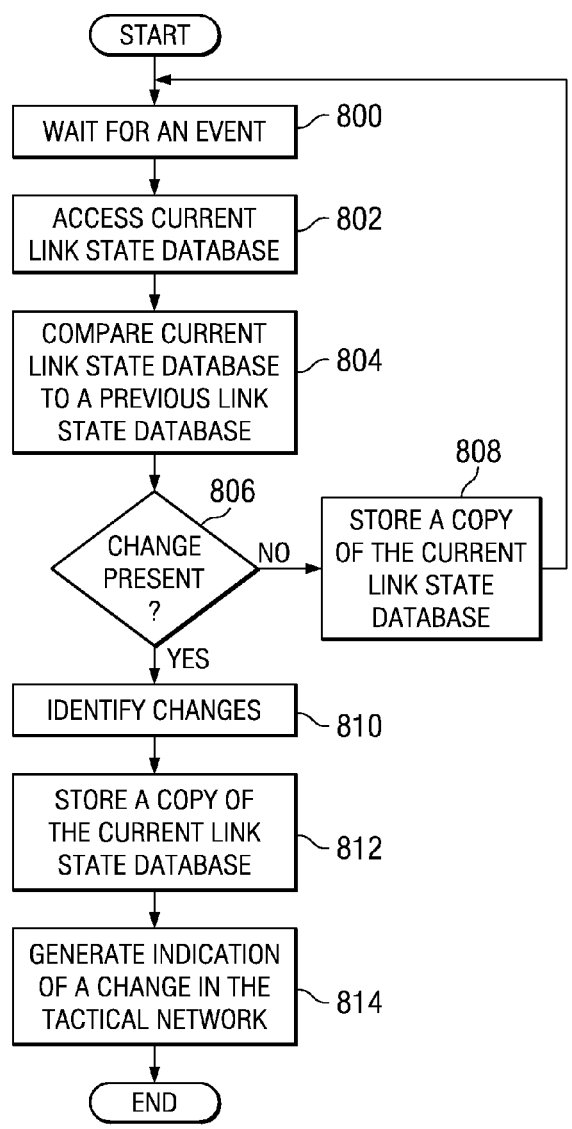
FIG. 8 is a flowchart of a process for identifying changes in a tactical network in accordance with an advantageous embodiment.

Turning now to FIG. 8, a flowchart of a process for identifying changes in a tactical network is depicted in accordance with an advantageous embodiment. The process depicted in FIG. 8 may be implemented in a smart agent, such as smart agent 400 in FIG. 4. More specifically, the process may be implemented in link state change monitor function 402 in FIG. 4.

The process begins by waiting for an event (operation 800). This event may be a periodic event, such as a timer. The expiration of the timer triggers the event for this operation. In other embodiments, the event in operation 800 may be a non-periodic event. For example, the autonomous system border router located on the gateway with the smart agent may indicate an update to the link state database. This indication may be used as an event in operation 800.

When the event occurs, the process accesses the current link state database (operation 802). The current link state database is the database maintained by the autonomous system border router process in the gateway on which the process is located in these examples. Thereafter, the process compares the current link state database to a previous link state database (operation 804). The previous link state database is a previous copy of the link state database from a prior time period.

Thereafter, the process determines whether a change has occurred in the current link state database (operation 806). If a change has not occurred, then a copy of the current link state database is stored to form the previous link state database for future comparisons (operation 808). Thereafter, the process returns to operation 800 to wait for another event.

If a change is present in operation 806, the process identifies all of the changes between the current link state database and the previous link state database (operation 810). Next, a current copy of the link state database is stored in place of the previous link state database for use in future comparisons (operation 812). The process then generates an indication of a change in the tactical network (operation 814) with the process terminating thereafter.

Figure 9:
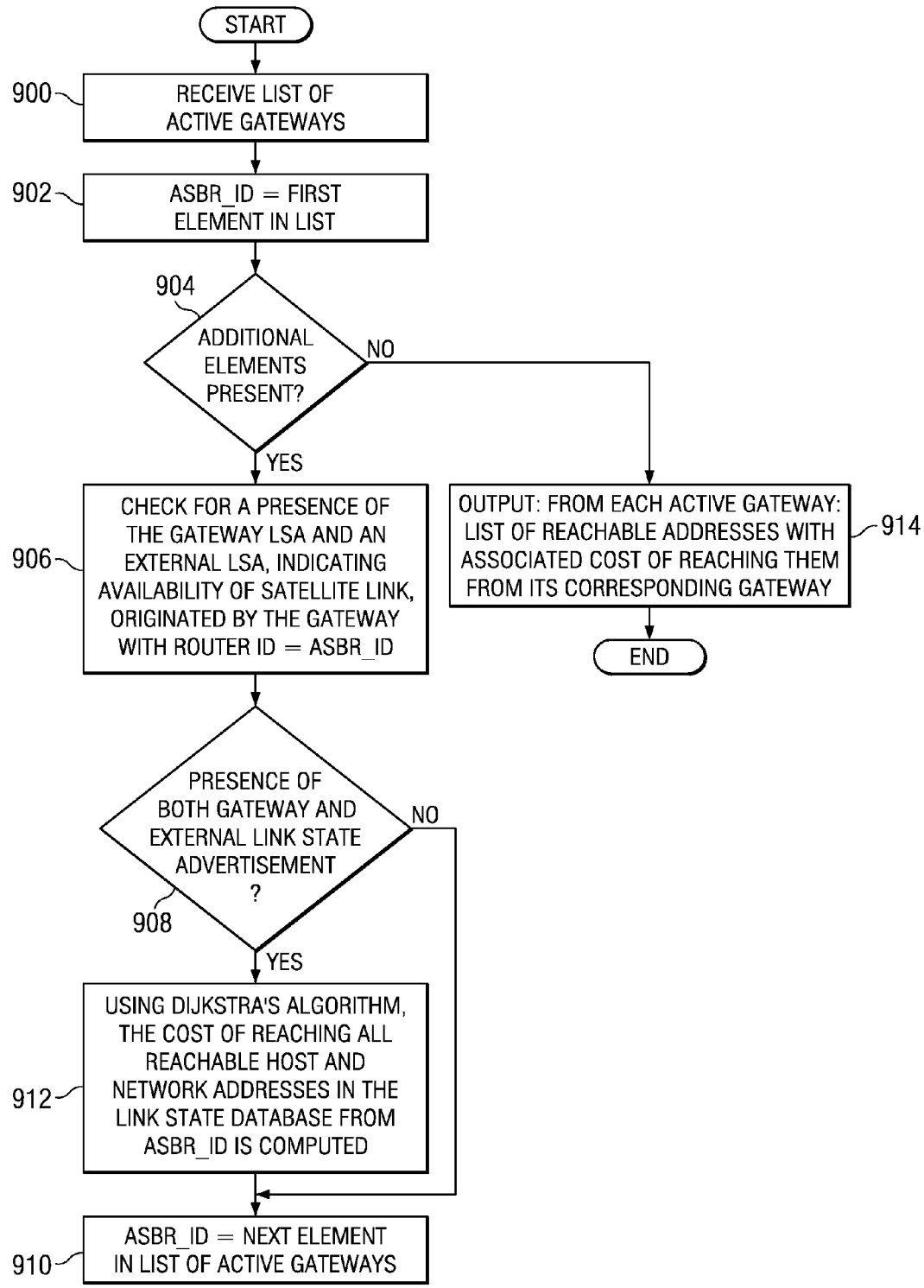
FIG. 9 is a flowchart of a process for performing cost computation in accordance with an advantageous embodiment.
Figure 10A:
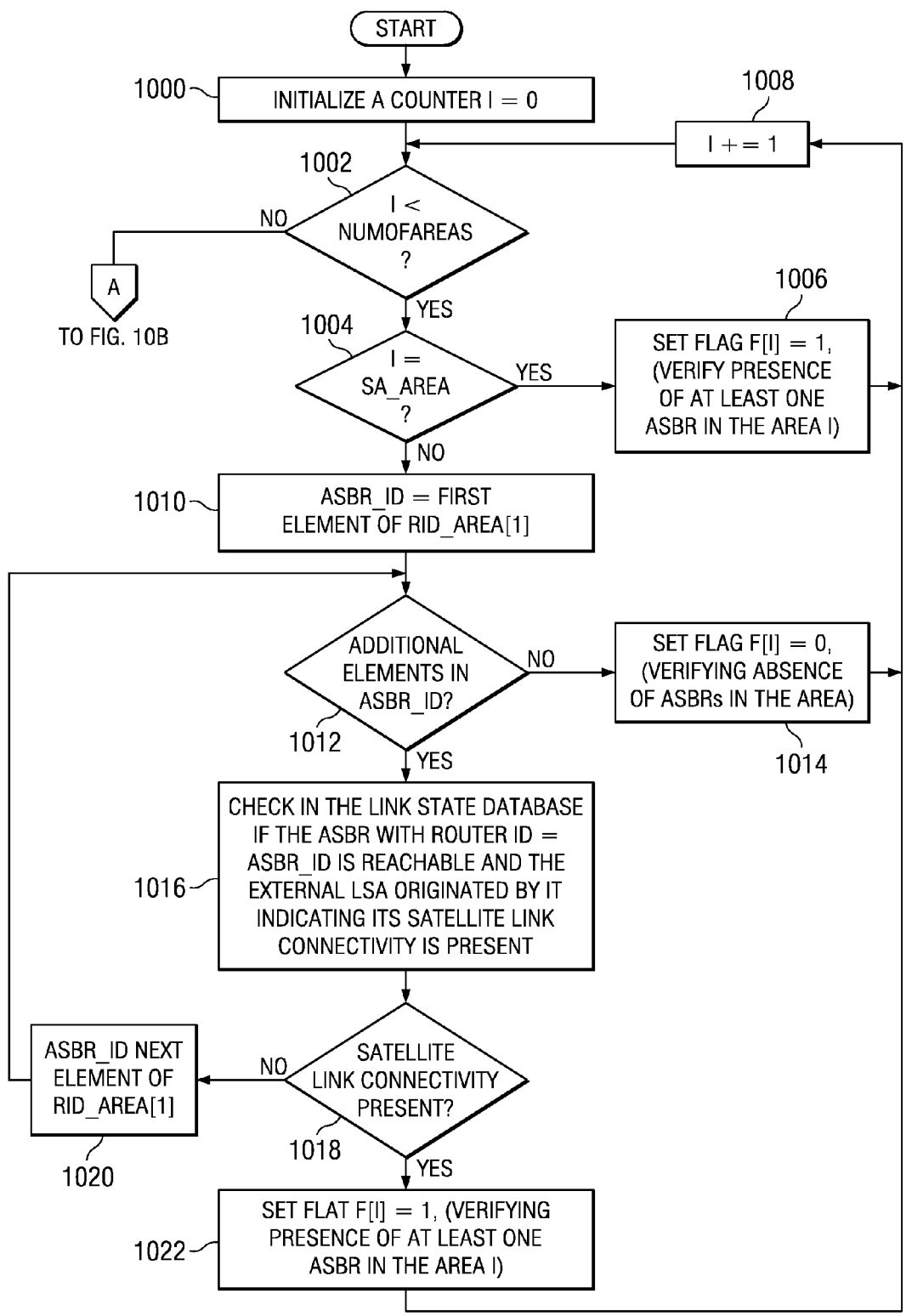
FIGS. 10A-10D are a flowchart of a process for computing costs to reach different destinations and tactical networks in accordance with an advantageous embodiment.
Figure 10B:
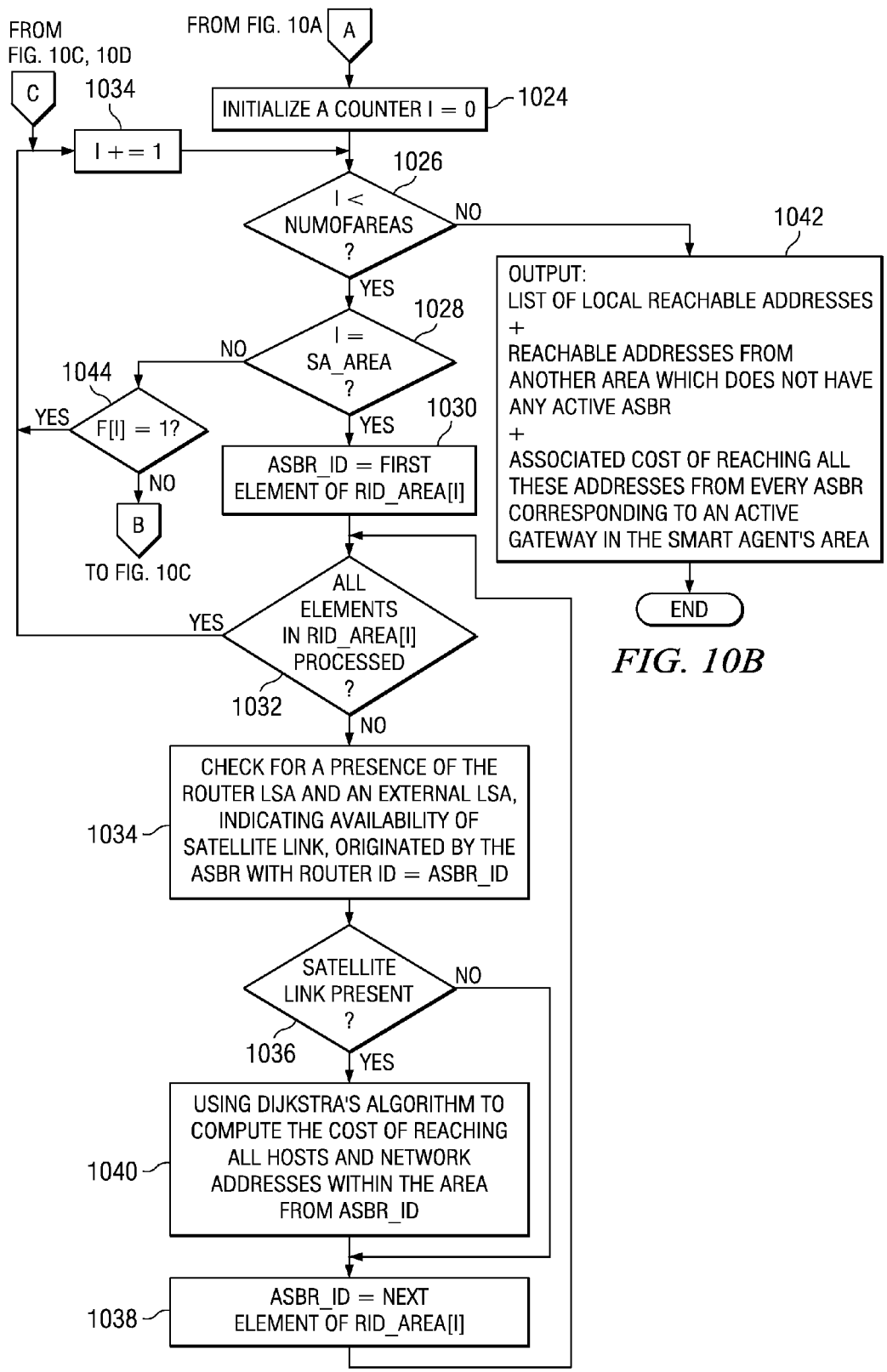
Figure 10C:
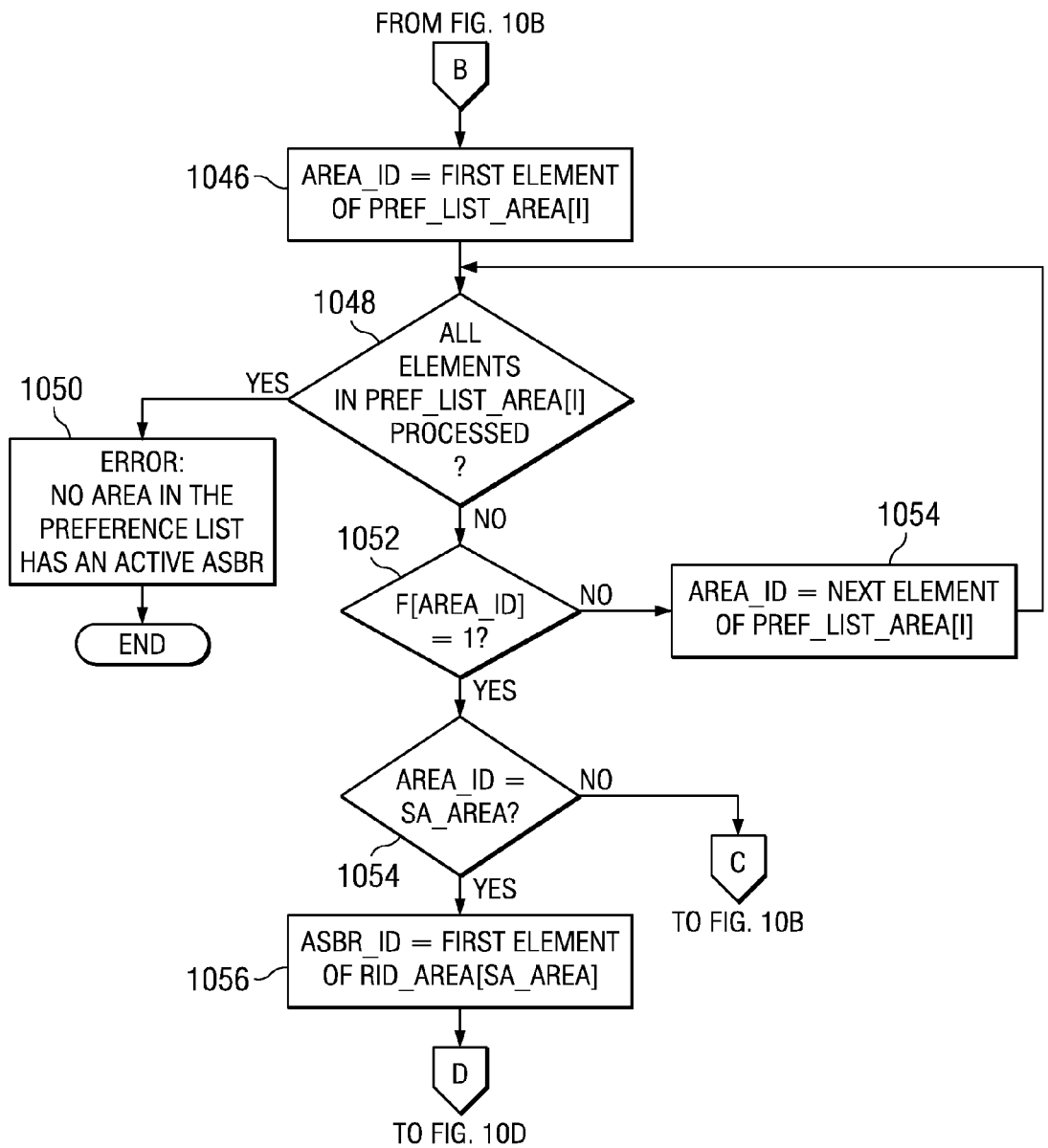
Figure 10D:
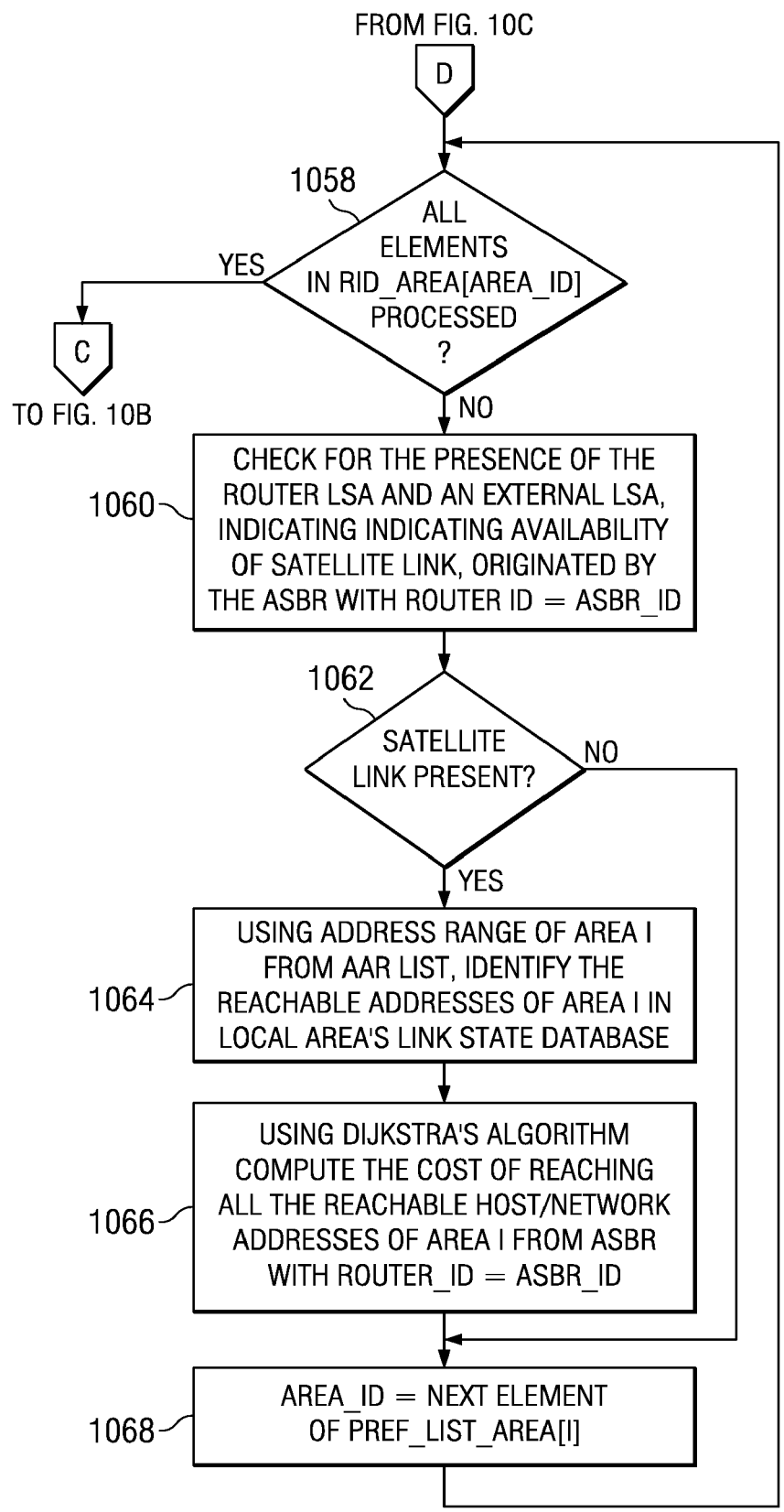
Figure 13A:
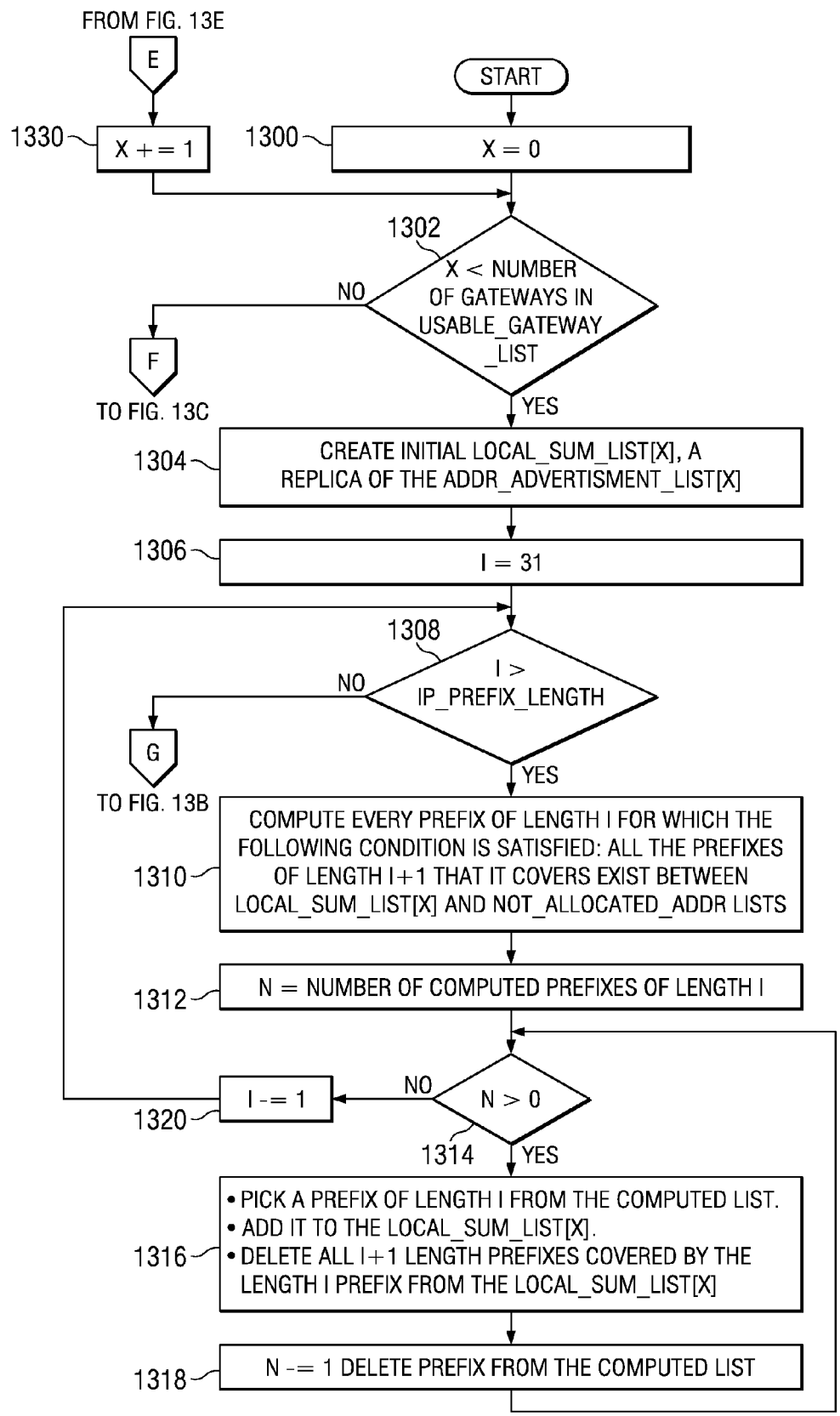
FIGS. 13A-13G are a flowchart of a process for performing auto summarization in accordance with an advantageous embodiment.
Figure 13B:
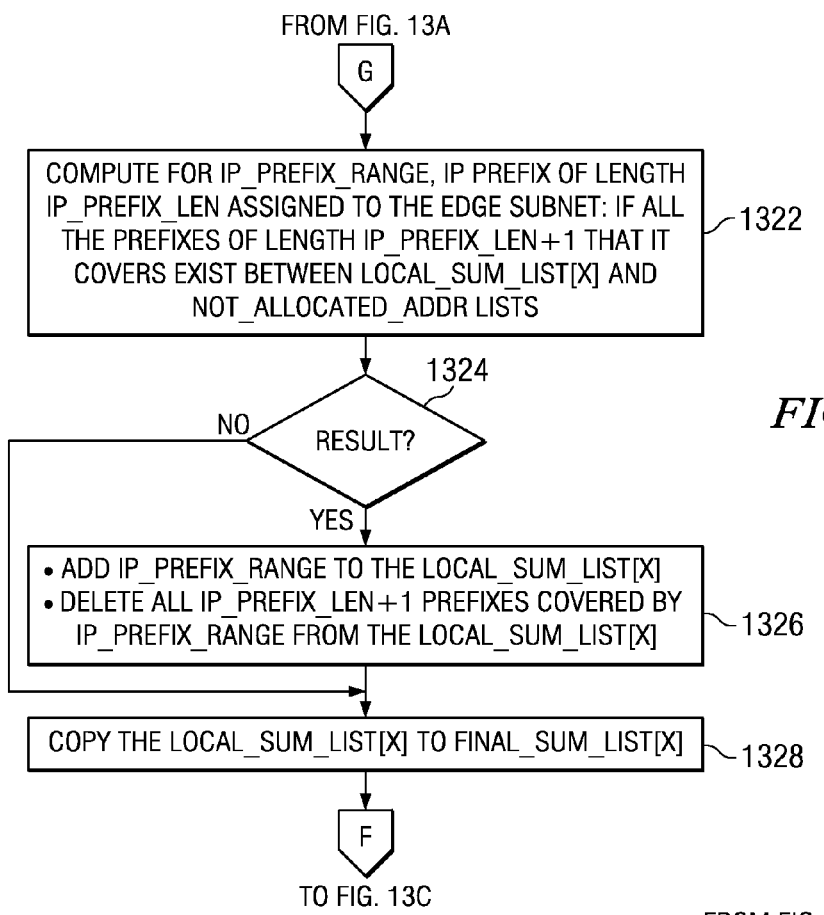
Figure 13D:
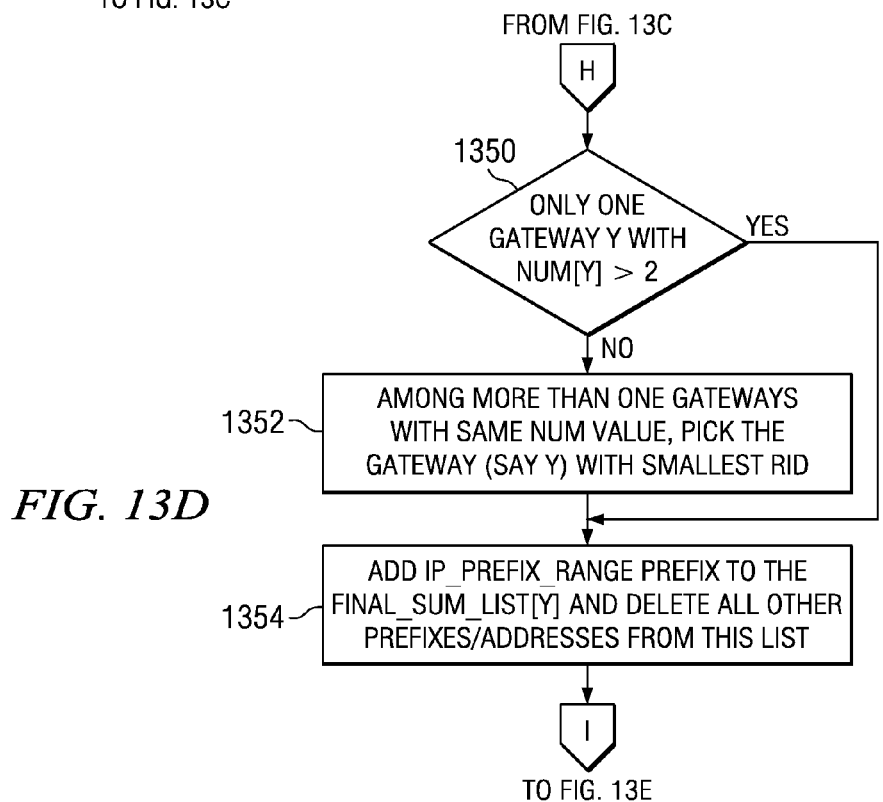
Figure 13C:
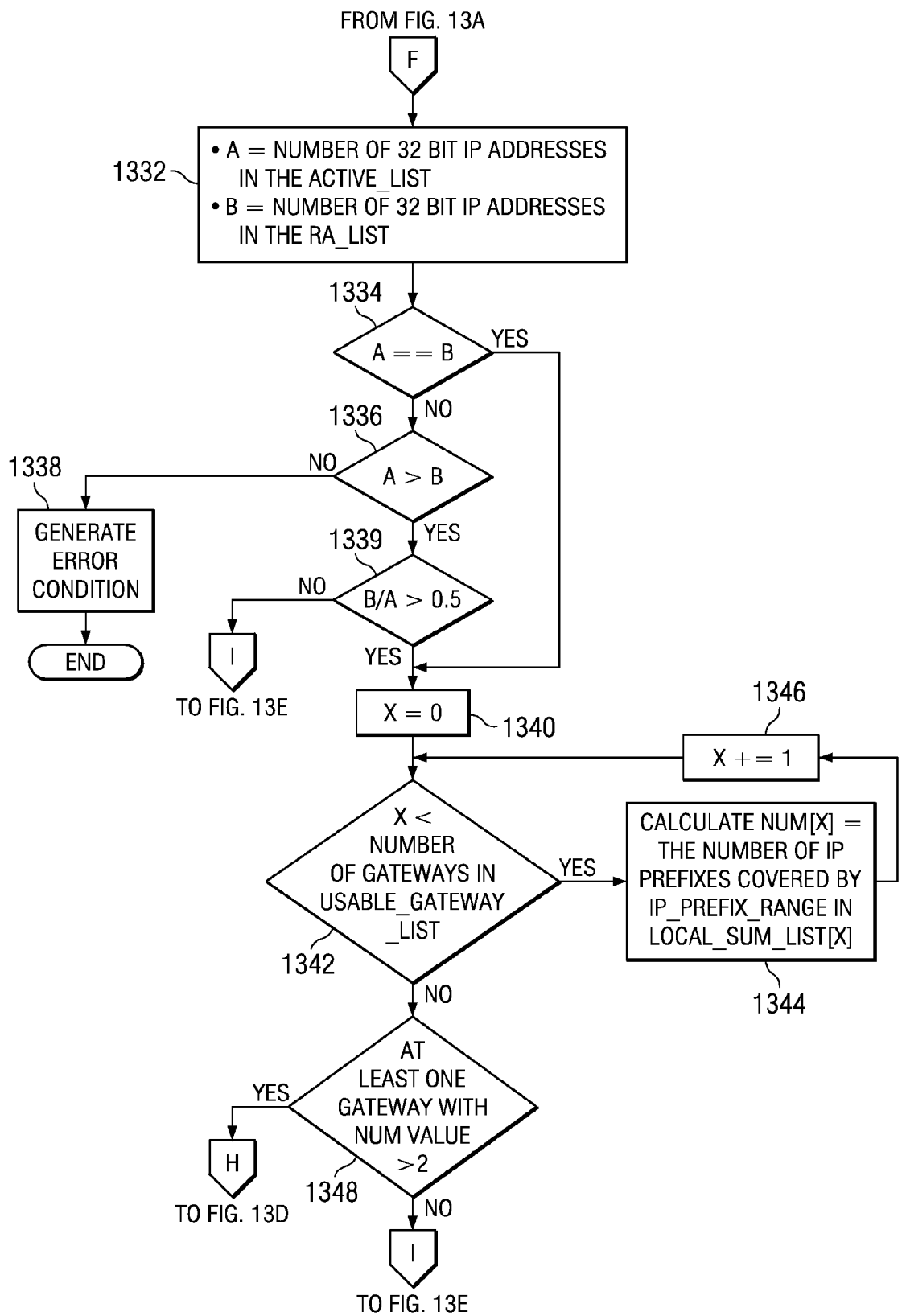
Figure 13E:
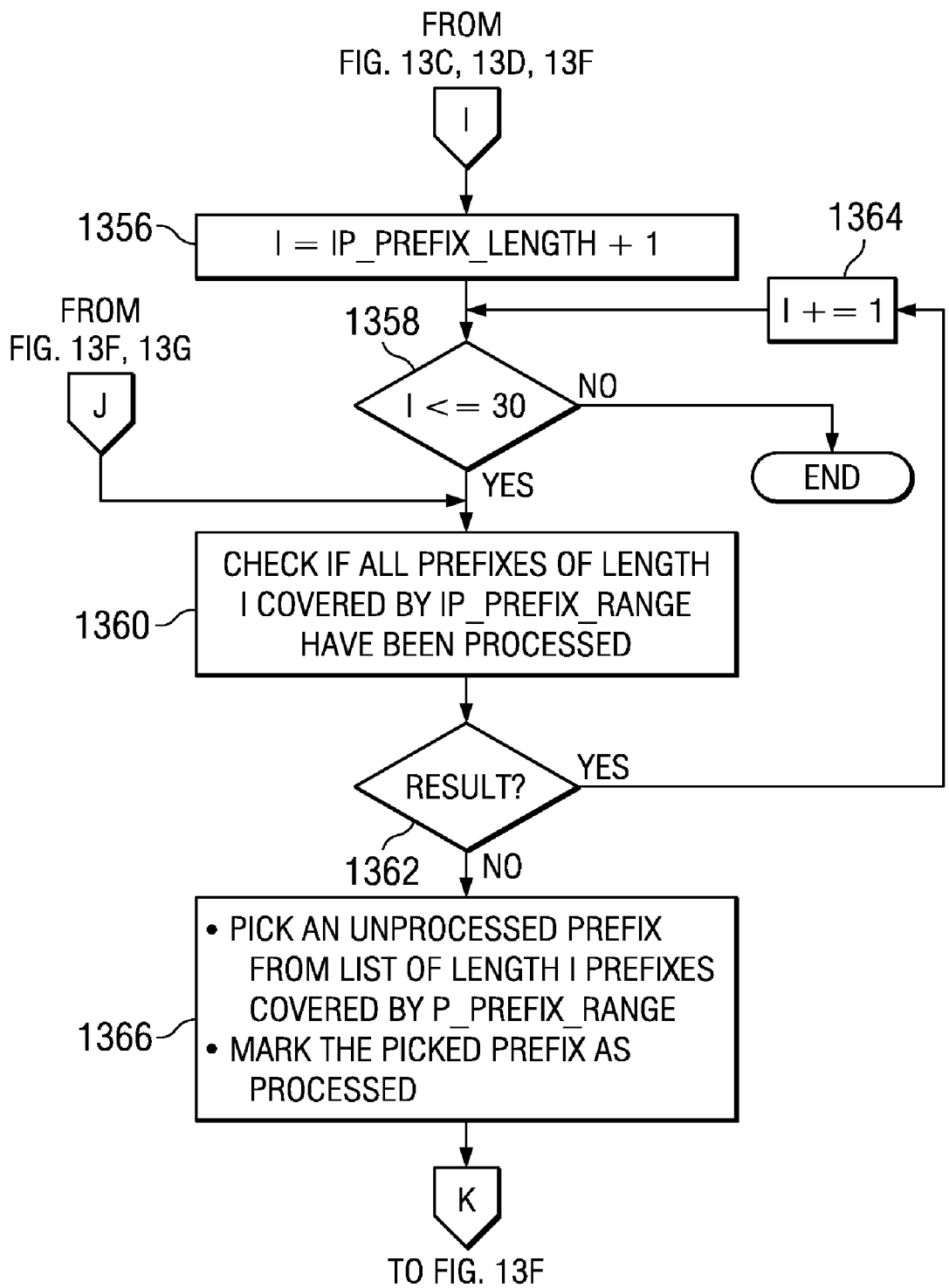
Figure 13F:
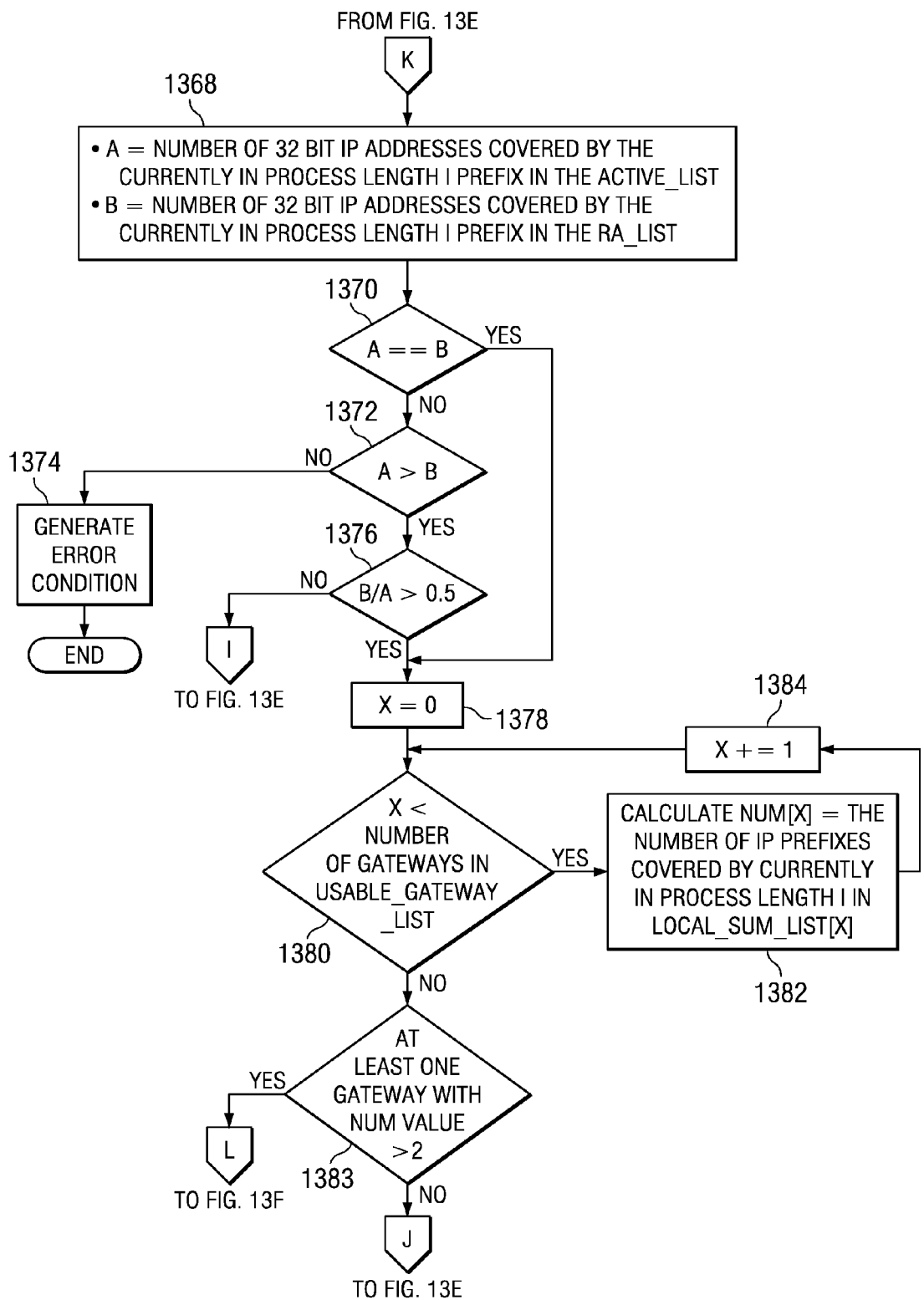
Figure 13G:
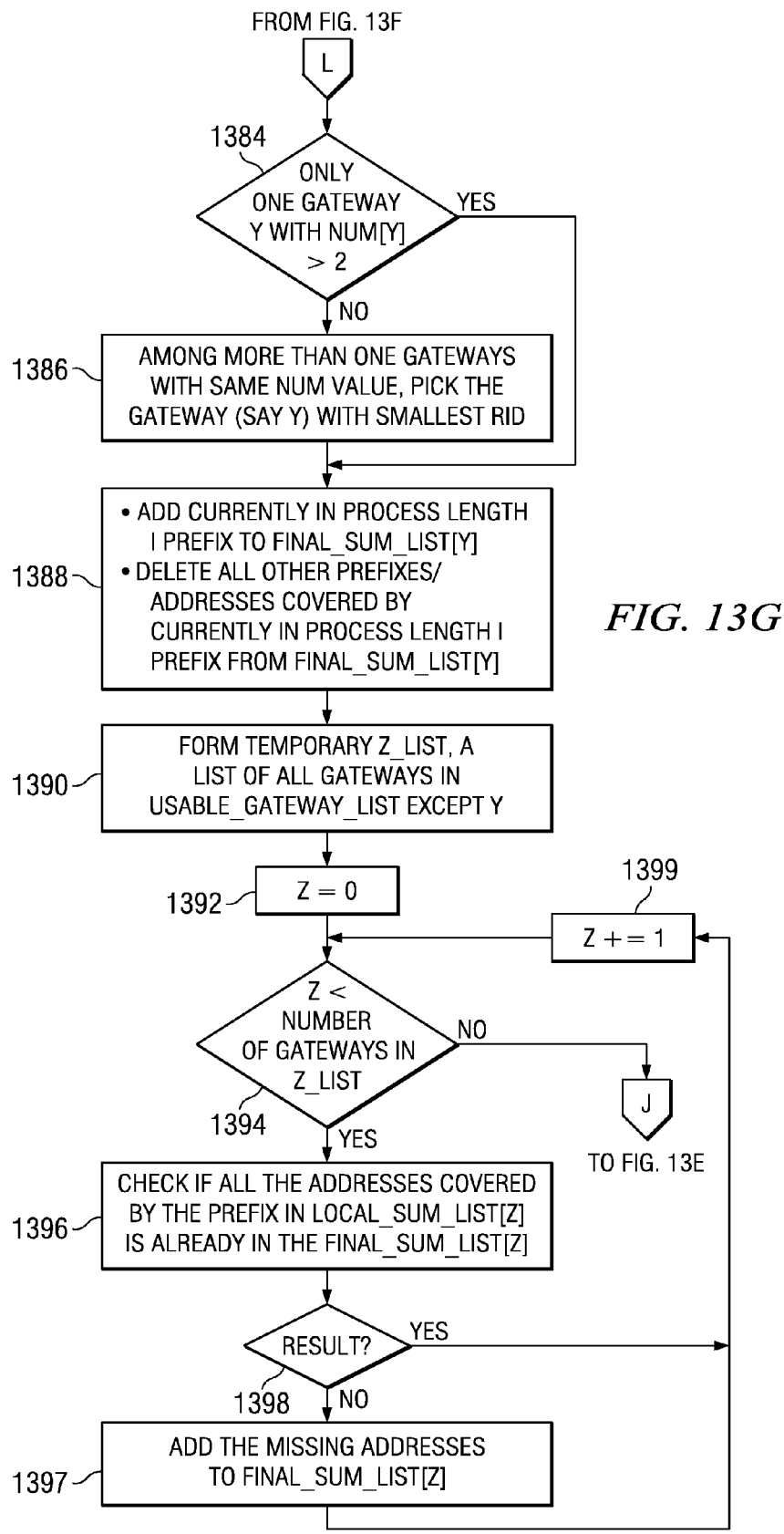

With reference now to FIG. 9, a flowchart of a process for performing cost computation is depicted in accordance with an advantageous embodiment. The process illustrated in FIG. 9 may be implemented in a component, such as smart agent 400 in FIG. 4. This process may be implemented in cost computation function 404 in FIG. 4. In particular, this process is an example of a process that may be used to identify cost to reach different addresses in a tactical network having a configuration, such as tactical network 500 in FIG. 5.

The process begins by receiving a list of active gateways (operation 900). Thereafter, the variable ASBR_ID is equal to the first element in the list of gateways (operation 902). Next, a determination is made as to whether additional elements are present in the list of active gateways (operation 904).

If additional elements are still present, the process checks for a presence of the gateway link state advertisement and an external link state advertisement indicating an availability of a satellite link originated by the gateway with a router ID equal to ASBR_ID (operation 906). Next, a determination is made as to whether the gateway and the external link state advertisement are present (operation 908). If both are not present, the process sets ASBR_ID equal to the next element in the list of active gateways (operation 910). Thereafter, the process returns to operation 904 as described above.

With reference again to operation 908, if both the gateway and the external link state advertisement are present, then Dijkstra's algorithm is used to compute the cost of reaching all reachable host and network addresses in the link-state database from ASBR_ID (operation 912). Thereafter, the process returns to operation 910 as described above.

With reference again to operation 904, if additional elements are not present in the list of active gateways, an output is generated (operation 914). This output includes a list of reachable addresses with a cost of reaching these addresses from the corresponding autonomous system border router processes in a gateway. The process then terminates. Dijkstra's algorithm is an algorithm that solves for a single shortest path between two points and is used in these examples to identify a cost of reaching the different desinations.

Turning now to FIGS. 10A-10D, a flowchart of a process for computing costs to reach different destinations and tactical networks is depicted in accordance with an advantageous embodiment. The process illustrated in FIGS. 10A-10D may be implemented in a smart agent, such as smart agent 400 in FIG. 4. In particular, the process may be implemented in cost computation function 404 in FIG. 4. The process illustrated in FIGS. 10A-10D is used to identify costs to reach different destinations in a network having a configuration, such as tactical network 600 in FIG. 6.

In this example, a subset of nodes with gateway capability are selected to pretend to serve as active gateways and include a list of router identifications of the corresponding gateways that are present in any particular area. In these examples, the gateways provide inter-network communications using autonomous system border routers. These routers are processes executing on the gateways. For each area, an order of preferences are provided for the areas in case an active autonomous system border router is absent in the area for which other autonomous system border routers may be evaluated for taking responsibility of disseminating routing information for this particular area in which an autonomous system border router is absent.

Further, a list of configured areas with allocated address ranges also is present in this type of configuration. The link state databases used by each smart agent on different gateways are soon to be not identical to those in other areas. The process illustrated below is used to take these differences in link state databases into account in identifying costs to reach different destinations within the tactical network.

The process begins by setting a counter I equal to 0 (operation 1000). Thereafter, a determination is made as to whether I is less than NumOfAreas (operation 1002). NumOfAreas is the number of configured areas for the particular tactical network. For example, tactical network 600 in FIG. 6 has three areas.

If I is less than NumOfAreas, a determination is made as to whether I is equal to SA_Area (operation 1004). SA_Area is the resident area of the autonomous system border router with which the smart agent is located on a gateway. If I is equal to SA_Area, then a flag F[i] is set equal to 1 (operation 1006). This flag is used to verify the presence of at least one autonomous system border router being present in the area I. Thereafter, the counter I is incremented (operation 1008). The process then returns to operation 1002 to process another area as described above.

Operation 1004 is used to determine whether an autonomous system border router is present in the particular area that is being processed. If I is not equal to SA_Area in operation 1004, then an autonomous system border router may not be present and the process then sets ASBR_ID equal to the first element of RID_Area[i] (operation 1010). RID_Area[i] is a list of router identifications for autonomous system border routers corresponding to different active gateways in the area. Thereafter, a determination is made as to whether additional elements are present in ASBR_ID (operation 1012). If additional elements are not present in ASBR_ID, the flag F[i] is set equal to 0 (operation 1014). This flag indicates that an absence of autonomous system border routers are present for this particular area. The process then returns to operation 1008 as described above.

If additional elements are present in ASBR_ID, the link state database is checked to see if the autonomous system border router with the border router ID equal to ASBR_ID is reachable and if the external link state advertisement originated by this router indicates that the satellite link connectivity is present (operation 1016).

Thereafter, a determination is made as to whether satellite link connectivity is present (operation 1018). If the satellite link connectivity is not present, the process then sets ASBR_ID to the next element of RID_Area[i](operation 1020) with the process then returning to operation 1012 as described above. On the other hand, if satellite link connectivity is present, the process then sets the flag F[i] equal to 1 (operation 1022) with the process then returning to operation 1008 as described above. As can be seen, operation 1002 through operation 1022 is used to identify whether autonomous system border routers are present for different areas.

With reference again to operation 1002, if the number of areas is no longer less than I, this determination means that all of the areas have been processed. As a result, the process then initializes the counter I equal to zero again (operation 1024). Thereafter, a determination is made as to whether I is less than or equal to NumOfAreas (operation 1026). This operation is used to determine whether all of the areas have been processed for costs to reach different destinations. If I is less than or equal to NumOfAreas, a determination is made as to whether I is equal to SA_Area (operation 1028). If I is equal to SA_Area, then ASBR_ID is set equal to the first element of RID_Area[i] (operation 1030). Each element in this list represents an area.

Next, a determination is made as to whether all elements in RID_Area[i] have been processed (operation 1032). If all of the elements have been processed, the process increments the counter I by one (operation 1034). The process then returns to operation 1026 as described above. Otherwise, the process checks for a presence of a router link state advertisement and an external link state advertisement that indicates an availability of the satellite link originated by the autonomous system border router with a router ID equal to ASBR_ID (operation 1035).

A determination is then made as to whether a satellite link is present (operation 1036). If a satellite link is not present, the process then sets ASBR_ID equal to the next element of RID_Area[i] (operation 1038). The process then returns to operation 1032 as described above. If a satellite link is present, the process then uses the Dijkstra algorithm to compute the cost of reaching all hosts and network addresses within the area from ASBR_ID (operation 1040). This operation is performed to identify costs to reach the different addresses from the selected autonomous system border router that has a satellite link. The process then proceeds to operation 1038 as described above.

With reference again to operation 1026, if i is not less than NumOfAreas, then all of the areas have been processed and the process outputs a list of local area reachable addresses plus addresses from another area which does not have any active autonomous system border routers along with an associated cost to reaching these addresses from autonomous system border routers corresponding to an active gateway in the area of the smart agent (operation 1042). The process terminates thereafter.

With reference again to operation 1028, if i is not equal to SA_Area, then the process determines whether the flag F[i] is equal to 1 (operation 1044). If the flag is set equal to 1, the process returns to operation 1034.

Otherwise, Area_ID is set equal to the first element of Pref_list_Area[i] (operation 1046). Operation 1046 is used to select a first area from the list for processing. Pref_list_Area[i] is an order list of configured areas indicating a preference of picking an autonomous system border router from another area in case an active autonomous system border router is absent in the area being processed. In other words, this list defines area should be selected first.

Next, the process makes a determination as to all of the elements in Pref_list_Area[i] have been processed (operation 1048). This operation determines whether all of the areas in the list if all have been processed If all of the elements have been processed, then an error is reported (operation 1050) with the process terminating thereafter. In this case, the area does not have an active gateway that is in the list, resulting in an error.

Otherwise, a determination is made as to whether F[Area_id] is equal to 1 (operation 1052). This determination verifies whether there active gateways are present in the area. If the flag is not equal to 1, the process then sets Area_ID equal to the next element of Pref_list_Area[i] (operation 1054) with the process then returning to operation 1048. Operations 1046, 1048, 1052, and 1054 are used to identify an autonomous system border router from the preference list, Pref_list_Area[i].

With reference again to operation 1052, if the flag is set for the selected element from Pref_list_Area[i], that means an autonomous system border router is present from the preference list that has a communications link to a satellite, then a determination is made as to whether Area_ID is equal to SA_Area (operation 1054). If Area_ID is equal to SA_Area, then another smart agent is present in the area that is designated to disseminate routing information for area i and the process returns to operation 1034.

If Area_ID is not equal to SA_Area then ASBR_ID is set equal to the first element in RID_Area[SA_Area] (operation 1056). The process then determines whether all of the elements RID_Area[Area_ID] have been processed (operation 1058). If all of the elements have been processed, the process proceeds to operation 1034 as described above. If unprocessed elements are still present in RID_Area[Area_ID], the process checks for the presence of a router link state advertisement and an external link state advertisement that indicates an availability of a satellite link that is originated by the autonomous system border router with a router ID equal to ASBR_ID (operation 1060).

Next, the process makes a determination as to whether a satellite link is present (operation 1062). If a satellite link originated by the border router with the router ID equal to ASBR_ID is present, the address range of area i is used from the AAR list to identify the reachable addresses in area i in the link state database for the local area (operation 1064). The AAR list is a list containing an address range for each area.

Next, the process uses Dijkstra's algorithm to compute the cost of reaching all of the reachable host/network addresses of area i from the autonomous system border router with the router ID equal to ASBR_ID (operation 1066). Thereafter, the process sets Area_ID equal to the next element of Pref_list_Area[i] (operation 1068) with the process then returning to operation 1058 as described above.

With reference again to operation 1062, if a satellite link is not present, the process proceeds to operation 1068 directly.

Turning now to FIG. 11, a flowchart of a process for selecting routes using a policy is depicted in accordance with an advantageous embodiment. The process illustrated in FIG. 11 is a more detailed description of operation 1202 in FIG. 12. The process illustrated in this figure is an example of one policy that may be used to select addresses. Of course, other policies may be used in place of or in addition to those illustrated in FIG. 11, depending on the implementation.

The process begins by selecting an unprocessed address from the list of addresses (operation 1100). A determination is made as to whether the address is in a preferred list and if the gateway in the preferred list is in the area (operation 1102). In these examples, the area is an area, such as backbone area 602 in FIG. 6 or area 604 in FIG. 6. If the address is in the preferred list and if the gateway in the preferred list is in the area, the address is added to a reduced list (operation 1106).

Next, the gateway is marked as the primary one (operation 1108). The cost to reach the address from this gateway is added to the list (operation 1110). Thereafter, the process makes a determination as to whether additional unprocessed addresses are present on the list (operation 1112). If additional unprocessed addresses are present, the process returns to operation 1100. Otherwise, the process terminates.

With reference again to operation 1102, if the selected address for processing is not in the preferred address list and the gateway is not in the area, a determination is made as to whether the gateway has a least cost to reach the address as compared to other gateways in the same area (operation 1104). If the gateway has least cost to reach the address, the process proceeds to operation 1106. Otherwise, the process proceeds to operation 1112.

Turning now to FIG. 12, a flowchart of a process for selecting routes is depicted in accordance with an advantageous embodiment. The process illustrated in FIG. 12 may be implemented in a smart agent, such as smart agent 400 in FIG. 4. Further, this process may be implemented in route selection function 406 in FIG. 4. The process is used, in these examples, to select routes for advertisement by the gateway in which a smart agent is located.

The process begins by receiving a cost to reach addresses (operation 1200). These costs are for each address in the tactical network. Thereafter, the process selects routes for the gateway using a policy (operation 1202). Various selections and schemes are possible depending on the policy being applied. For example, the single least cost route may be used. This type of selection policy results a route being assigned a route to a gateway that provides a least cost for routing traffic to a destination. In this type of selection scheme, each address is assigned only to a single gateway. In another selection scheme, multiple routes may be present for redundancy and load balancing.

In another example, an address may be reachable through more than one gateway. As a result, two or more gateways may have the same address in their address list. The duplication is used for redundancy and possible load balancing processes that may occur within the tactical network. Further, specific selection of routes for specific purposes also may be taken into consideration in assigning routes to a particular autonomous system border router.

The process then generates a reduced list (operation 1204) with the process terminating thereafter. This reduced list is a reduced list of reachable addresses for the autonomous system border router. This list also includes the cost of reaching the addresses from the particular router. If multiple autonomous system border routers are assigned to the same address for redundancy or load balancing purposes, an indication of whether the autonomous system border routers is a primary or secondary router for the address also may be indicated in this list.

For example, with traffic engineered routes, a quality of service may be associated with traffic or data being exchanged between a tactical network and a satellite network. Gateways may advertise addresses such that incoming traffic is distributed across the tactical network in a manner that reuses the capacity of the tactical network while providing a desired quality of service treatment to the traffic.

With reference now to FIGS. 13A-13G, a flowchart of a process for performing auto summarization is depicted in accordance with an advantageous embodiment. The process illustrated in FIGS. 13A-13G may be implemented in a smart agent, such as smart agent 400 in FIG. 4. In particular, the processes illustrated in this figure may be implemented in auto summarization function 408 in smart agent 400 in FIG. 4.

In the different advantageous embodiments, auto summarization may be performed on a dynamic basis rather than on a static or planned basis as currently performed. The different advantageous embodiments may perform multiple levels of summarization. In these particular examples, a first level of summarization is performed to identify a list or set of prefixes for each gateway. This type of summarization is also referred to as a vertical summarization. Next, the different advantageous embodiments may select one gateway to broadcast the prefix for the Internet protocol address ranged assigned to the network in which the gateways are located. An additional level or levels of summarization also may be performed. These additional levels of summarization are also referred to as horizontal summarizations. These additional summarizations may add prefixes to other gateways in a manner that reduces the number of addresses that are sent or broadcast to another network from the tactical network, in these examples. The horizontal summarizations are performed using the list of prefixes identified in the first level of summarization. This process may be performed by each smart agent located at each gateway. Alternatively, a single smart agent may be identified to perform this process.

The horizontal summarizing may include assigning a gateway in the plurality of gateways a prefix for particular addresses assigned to the network. This horizontal summarizing also may include successively summarizing prefixes of one network assigned to a plurality of gateways dynamically to create prefixes with different prefix sizes for a set of bits within a plurality of bits using the prefixes and Internet Protocol addresses assigned to the plurality of gateways In these examples, operations 1300-1328 are part of a first level or vertical summarization. In this part of the process, the summarization of addresses is performed locally for each of the gateways. This summarization generates a list of prefixes for the entire network. This process is performed at each gateway on which a smart agent is located, in these examples.

The process begins by setting a counter X=0 (operation 1300). Thereafter, a determination is made as to whether the counter X is less than the number of gateways in Usable_Gateway_List (operation 1302). Usable_Gateway_List is a list of gateways that can be used by incoming traffic from one network to reach addresses located in another network. For example, the first network may be a satellite network with the second address being a tactical network. These addresses are destinations that may be reached by the incoming traffic into the tactical network.

If the number of gateways in Usable_Gateway_List is less than the counter X, an initial Local_Sum_List[X] is created, which is a replica of Addr_Advertisment_List[X] (operation 1304). Local_Sum_List[X] is a list of summarized prefixes for a particular gateway, gateway X, after a local summarization process has been performed. Addr_Advertisment_List[X] is a list of addresses located in the first network that is selected by some function for advertisement into a second network by a gateway. In these examples, the function may pick only a single gateway to advertise an IP address.

Thereafter, the counter I is set equal to 31 (operation 1306). A determination is made as to whether the counter I is greater than IP_Prefix_Length (operation 1308). IP_Prefix_Length indicates a number of mass bits in an IP_Prefix_Range. The IP_Prefix_Range is a prefix range assigned to a first network in these examples. In these examples, the first network may be a tactical network.

If the counter I is greater than IP_Prefix_Length, the process computes every prefix of Length I equal to counter I for which all prefixes of length I+1 that it covers exists between Local_Sum_List[X] and Not_Allocated_Addr lists (operation 1310). A Not_Allocated_Addr list is a list of radio frequency IP addresses from IP_Prefix_Range. Then, a counter N is set equal to the number of computed prefixes having length I (operation 1312).

Afterwards, a determination is made as to whether the value of counter N is greater than zero (operation 1314). If the value of N is greater than zero, then the process picks a prefix of length I from the computed list, adds this prefix to Local_Sum_List[X], and deletes all I+1 length prefixes covered by the length I prefix from Local_Sum_List[X] (operation 1316).

Thereafter, the counter N is decremented and the prefix is deleted from the computed list (operation 1318). The process then returns to operation 1314. This loop continues with prefixes being deleted until N is no longer greater than 0 in operation 1314. The process then decrements the counter I by 1 (operation 1320). The process then proceeds to operation 1308 as described above.

With reference again to 1308, if the value of counter I is not greater than IP_Prefix_Length, the process then computes for IP_Prefix_Range an IP prefix of length of IP_Prefix_Len assigned to the edge subnet: If all prefixes of length IP_Prefix_Len+1 that it covers exists between Local_Sum_List[X] and Not_Allocated_Addr lists (operation 1322). In this example, IP_Prefix_Range is a prefix range assigned to the first network.

Then, a determination is made as to whether a result is present (operation 1324). If a result is present, the process adds a IP_Prefix_Range to Local_Sum_List[X], deletes all IP_Prefix_Len+1 prefixes covered by IP_Prefix_Range from Local_Sum_List[X] (operation 1326). Then, the process copies Local_Sum_List[X] to Final_Sum_List[X] (operation 1328). The process also proceeds to operation 1328 if a result is not present in operation 1324. Final_Sum_List[X] is a list of final summarized prefixes that a gateway, gateway X, is picked to advertise as a result of summarization in using information across the different gateways.

Operations 1328-1354 are operations performed for a second level of summarization in the dynamic summarization process illustrated in these different advantageous embodiments. The process then increments the counter X by 1 (operation 1330). Thereafter, the process proceeds to operation 1302 as described above.

If in operation 1302, the number of gateways in Usable_Gateway_List is no longer less than counter X, the process sets the variable A equal to the number of 32-bit IP addresses in Active_List and sets the variable B equal to the number of 32-bit IP addresses in RA_List (operation 1332).

This type of summarization, in this illustrative example, is a horizontal summarization in which the best gateway for advertising a prefix for the network is identified. Active_List is a list of all IP addresses within IP_Prefix_Range that are not in the Not_Allocated_Addr list. RA_List is a list of all 32-bit IP addresses covered by the union of IP prefixes in Addr_Advertisment_List[X] of all usable gateways.

Next, a determination is made as to whether A is equal to B (operation 1334). Operation 1334 is used to determine whether a segmentation is present in the network. If A is equal to B, then no segmentation is present. If A is not equal to B, segmentation is present and the process determines whether A is greater than B (operation 1336). If A is not greater than B, then an error condition is generated (operation 1338) with the process terminating thereafter. On the other hand, if A is greater than B, then a determination is made as to whether B divided by A is greater than 0.5 (operation 1339). Operation 1339 is used to determine whether the process is located in the larger segment. If B divided by A is greater than 0.5, the process is located in the larger segment and the process sets the counter X equal to 0 (operation 1340). The process also proceeds to operation 1340 if A is equal to B in operation 1334.

Next, a determination is made as to whether counter X is less than the number of gateways in Usable_Gateway_List (operation 1342). If the number of gateways in Usable_Gateway_List is less than X, then the process calculates NUM[X] equal to the number of IP prefixes covered by IP_Prefix_Range in Local_Sum_List[X] (operation 1344). NUM[X] is a temporary variable in these examples. Thereafter, the process increments the counter X by 1 (operation 1346). The process then returns to operation 1342. This loop continues until the number of gateways in Usable_Gateway_List is no longer less than X in operation 1342.

Thereafter, the process determines whether at least one gateway has a calculated value for NUM[X] that is greater than 2 (operation 1348). If at least one gateway has a calculated value for NUM[X] that is greater than 2, the process determines whether only one gateway is present with a value Y that is greater than 2 (operation 1350). This operation is used to determine how many gateways have this value. If multiple gateways have a temporary value greater than 2, the process picks the gateway with the smallest RID from among gateways having the same temporary value (operation 1352).

Operations 1350 and 1352 are used as a tie breaker when more than one gateway is present having the highest number of addresses. Operation 1352 presents one way to break a tie based on an identifier in a list. Other mechanisms may be used in another implementation. Other mechanisms also may be used depending on the particular implementation. The process adds IP_Prefix_Range prefix to the final Local_Sum_List[Y] and deletes all other prefixes from the list (operation 1354). The process also proceeds to operation 1354 if there is only one gateway with a value of Y that is greater than 2.

Operations 1356-1366 are part of a third level of summarization. In these examples, this level of summarization is a horizontal summarization across the different gateways. This level of summarization is performed to select prefixes that may be used in addition to the prefix selected in the second level of summarization.

In these examples, the prefixes may be for other bits, such as the first 24 bits, the first 25 bits, the first 26 bits, and so on. In these illustrative examples, this type of summarization is used to identify additional prefixes and may be performed for identifying prefixes up to some number of bits, such as, the 30th bit. Of course, other numbers of bits may be used. In other examples, less prefixes may be identified by using less bits. The actual number of prefixes identified may differ, depending on the particular implementation.

Further, this portion of the process selects the best gateway to advertise this prefix. Thereafter, the process sets the counter I equal to IP_Prefix_Length+1 (operation 1356). Operation 1356 starts the process, in these examples, at the 25th bit of the number of bits present for the addressing scheme. In these examples, the addressing scheme uses 32 bits. The process also proceeds to operation 1356 directly from operation 1348 if at least one gateway with a temporary value greater than 2 is not present. Additionally, the process proceeds to operation 1356 from operation 1339, if the process is not located in a larger segment.

Next, a determination is made as to whether the value I is less than or equal to 30 (operation 1358). If I is not less than or equal to 30, the process terminates. Otherwise, the process checks to see if all the prefixes of length I covered by IP_Prefix_Range have been processed (operation 1360).

Next, a determination is made as to whether the result of this check is yes or no (operation 1362). If the result is yes, the process increments the counter I by 1 (operation 1364) and returns to operation 1358. If the result of operation 1362 is no, the process picks an unprocessed prefix from the list of length I prefixes covered by IP_Prefix_Range and marks the picked prefix as processed (operation 1366).

Operation 1366 is used to select each prefix for the length of processing. For example, at the 25th bit in a 32 bit addressing scheme, in which the first 24 bits have been fixed, two prefixes may be identified, one for a logic "0" and one for a logic "1". At the 26th bit, four prefixes may be present, such as "00", "01", "10", and "11". At the 27th bit, eight prefixes may be selected for processing.

Next, the process sets the variable A equal to the number of 32-bit IP addresses covered by the currently in process length I prefix in Active_List and sets B equal to the number of 32-bit IP addresses covered by the currently in process length I prefix in RA_List (operation 1368). Thereafter, a determination is made as to whether A is equal to B (operation 1370).

If A is not equal to B, the process then determines whether A is greater than B (operation 1372). If A is not greater than B, the process then generates an error condition (operation 1374) with the process terminating thereafter. Otherwise, the process determines whether B divided by A is greater than 0.5 (operation 1376). If B divided by A is not greater than 0.5, the process is not located in the larger segment and the process proceeds to operation 1356 as described above. If B divided by A is greater than 0.5, the process sets the counter X equal to 0 (operation 1378). The process also proceeds to operation 1378 if A is equal to B in operation 1370.

Operations 1370-1376 are used to determine whether a segmentation is present in the network and to determine which network may be assigned prefixes if segmentation has occurred. In these examples, the network with the largest number of addresses is assigned or selected for handling the prefixes.

Thereafter, a determination is made as to whether the counter X is less than the number of gateways within Usable_Gateway_List (operation 1380). If the number of gateways in Usable_Gateway_List is less than X, the process calculates NUM[X] as being equal to the number of IP prefixes covered by the currently in process length I in Local_Sum_List[X] (operation 1382). The currently in process length I is the length that is currently being processed in operation 1382. This operation is used to identify addresses that are covered by the prefixes, in these examples. Thereafter, the process increments the counter X by 1 (operation 1384). The process then returns to operation 1380 as described above.

When X is no longer less than the number of gateways in Usable_Gateway_List in operation 1380, the process then determines whether at least one gateway has a temporary value greater than 2 (operation 1383). Operation 1383 is used to determine whether three or more addresses are present. Summarization may be used, in these examples, only when three or more addresses are present. Of course, other numbers of addresses may be selected, depending on the particular implementation. For example, summarization may not be performed unless five of eight addresses are present in the number of addresses covered by the prefix. If at least one gateway has a value greater than 2, a determination is made as to whether only gateway Y is present with Num[Y] being greater than 2 (operation 1384).

If more than one gateway is present in the determination in operation 1384, the process picks a gateway with the smallest RID among more than one gateway with the same Num value (operation 1386). Operations 1384 and 1386 are used to iden- tify whether more than one gateways has the same number of addresses. If two or more gateways are present, operation 1386 is used to select a gateways that will manage the prefix. Turning back to operation 1382, if not more than one gateway is present, the process returns to operation 1360.

Afterwards, the process adds the currently in process length I prefix to Final_Sum_List[Y] and deletes all other prefix/addresses covered by currently in process length I prefix from Final_Sum_List[Y] (operation 1388). The result of operation 1388 is that only a single gateway has the selected prefix. All of the addresses that match the prefix are deleted as a part of operation 1388.

The process also proceeds to operation 1388 if only gateway Y is present with NUM[Y] being greater than 2 in operation 1384. Next, the process forms a temporary Z_List containing a list of all gateways in Usable_Gateway_List except for gateway Y (operation 1390). Z_List is a temporary list to store selected gateways in these examples.

Then, the process sets a counter Z equal to 0 (operation 1392). Thereafter, the process determines whether the value Z is less than the number of gateways in Z_List (operation 1394). If Z is less than the number of gateways in Z_List, the process then checks to see if all addresses covered by the prefix in Local_Sum_List[Z] already in Final_Sum_List[Z] (operation 1396).

The process then checks the results to determine whether the result is a yes or a no (operation 1398). If the result is a yes, the process increments the counter Z by 1 (operation 1399) and returns to operation 1394. If the result is no, the process adds the missing addresses to Local_Sum_List[Z] (operation 1397).

Operations 1396 and are used to determine whether addresses are covered by the prefix that has been selected for the gateway. If addressed are covered by the prefix selected for the gateway and another gateway, the addresses covered by that prefix are added to ensure that all of the addresses are covered by each list for each gateway. For example, four gateways, gateways A, B, C, and D may send or advertise lists L1, L2, L3, and L4. Summarization in the first level produces list L1', L2', L3', and L4'. At a second level of summarization, one of the gateways, such as gateway B, may be identified as having the largest number of addresses in the summarized list L2. This list is replaced with the prefix for the network address. In these examples, the prefix may be 192.168.1.X. 192 represents 8 bits, 168 represents 8 bits, 1 represents 8 bits, and X represents 8 bits that may be assigned. At this point, the list for gateways B becomes L2".

With addresses 192.168.1.0 and 192.168.1.1, two addresses are present, and the 25th bit in X may be selected by picking a 1 or a 0. If the addresses is 192.168.1.X with 0 being the 25th bit in X, a review of lists L1', L3', and L4' may be made to see if any of these lists have an addresses that is covered by 192.168.1.0 for the 25th bit in X. Other bits within X, such as bits 26, 27, 28, 29, and 30 are not considered. A determination is made as to whether any of the gateways, gateway A, gateway B, and gateway C, has the largest number of addresses.

If one of the gateways has the most addresses and those addresses are more than three, that address is replaced with the prefix for the 25th bit, which is 192.168.1.X with the 0 being the value of the 25th bit in X for this prefix. Now that a prefix is present for the 25th bit, any other gateways having a prefix must be examined to determine whether addresses within that gateway are covered by the 25th bit.

If addresses in a particular gateway having a prefix are present, those addressed covered by that prefix are placed back into the list. In this manner, each time a prefix is identified and assigned to a gateway, addresses are deleted from that gateway. As a consequence, addresses in other gateways that are covered by that prefix must be added back into the list if those addressed were deleted from a prior prefix. Each time, a prefix is added, addresses are removed and addresses are added back.

The different embodiments add addresses assigned to other gateways in the plurality of gateways that are covered by the selected prefix, in which the addresses are addresses removed from a previous summarization by another prefix having a different prefix size. The net change, however, is a reduction in addresses, in these advantageous embodiments. In these examples, when a network prefix size is processed, the process may be applied to a more specific prefix, which has more fixed bits. This prefix has a larger prefix size. Of course, the process may be applied from a larger to a smaller prefix size.

The process then proceeds to 1399 as described above. With reference again to operation 1394, if the value of Z is not less than the number of gateways in Z_List, the process returns to operation 1360 as described above.

Figure 14:
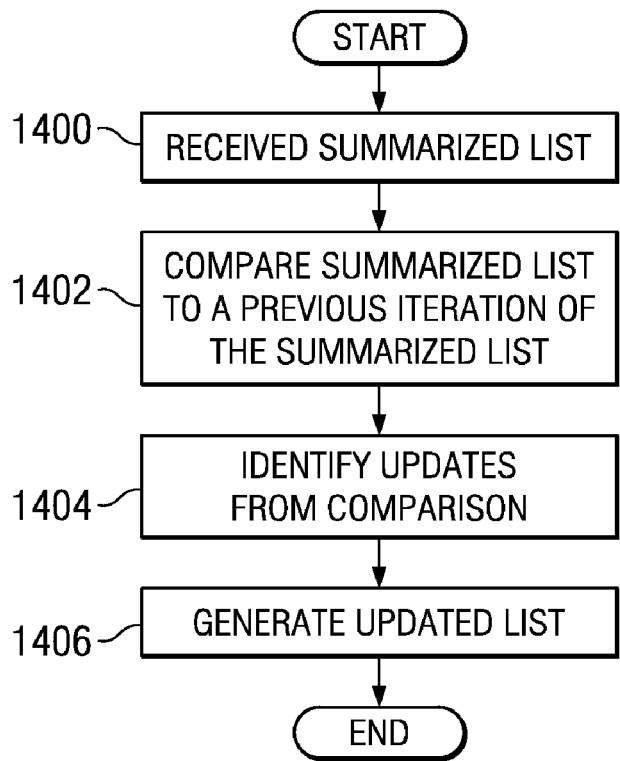
FIG. 14 is a flowchart of a process for generating an update list in accordance with an advantageous embodiment.

Turning now to FIG. 14, a flowchart of a process for generating an update list is depicted in accordance with an advantageous embodiment. The process illustrated in FIG. 14 may be implemented in a smart agent, such as smart agent 400 in FIG. 4. More specifically, the process may be implemented in update list function 410 in FIG. 4.

The process begins by receiving a summarized list (operation 1400). This is a list of prefixes that have been summarized using an auto summarization function after routes have been selected. Thereafter, the process compares the summarized list to a previous iteration of the summarized list (operation 1402). The process then identifies updates from the comparison of these two lists (operation 1404). An update list is generated based on the differences (operation 1406). These differences may include new advertisements and withdrawals of advertisements that are made to the satellite network. In particular, operation 1406 contains the routes that the gateway on which the smart agent is executing will advertise to route data to assign or associate a destination. The process terminates thereafter.

Figure 15:
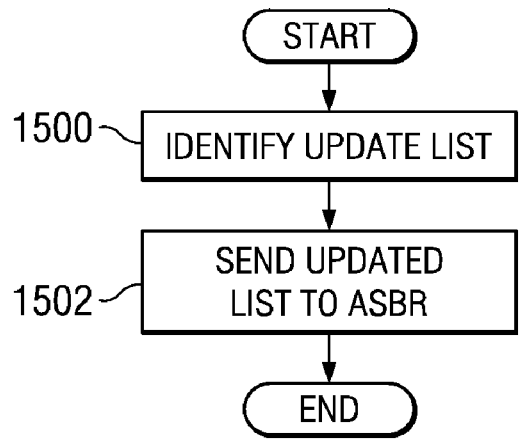
FIG. 15 is a flowchart of a process for performing an update of addresses in accordance with an advantageous embodiment.

Turning now to FIG. 15, a flowchart of a process for performing an update of addresses is depicted in accordance with an advantageous embodiment. The process illustrated in FIG. 15 may be implemented using smart agent 400 in FIG. 4. In particular, the process in FIG. 15 may be implemented in route update function 412 in FIG. 4.

The process begins by identifying an update list (operation 1500). Upon detecting the presence of an update reduced list, the process sends the update list to the autonomous system border router (operation 1502) with the process terminating thereafter. This update list is used by the autonomous system border router in its link state advertisements to the satellite network to provide the satellite network with addresses for the satellite network to use to send traffic to the tactical network for addresses handled by the gateway on which the autonomous system boarder router is located.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Figure 16A:
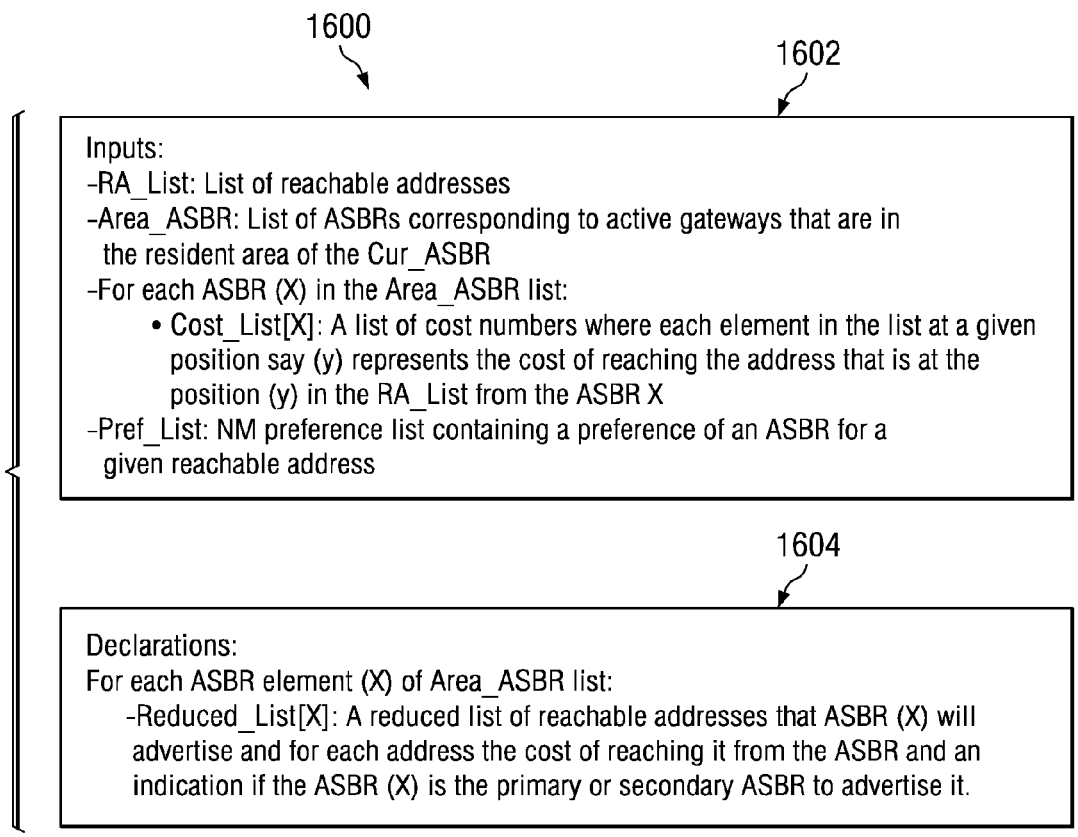
FIGS. 16A-16C are diagrams illustrating code for a process to select routes for a gateway in accordance with an advantageous embodiment.
Figure 16C:
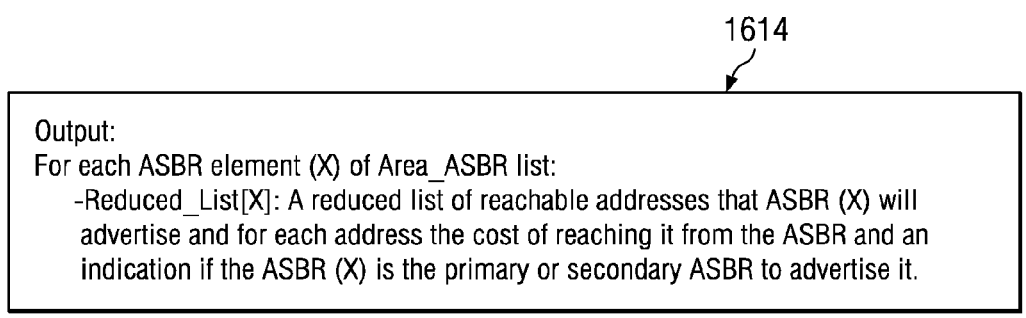
Figure 16B:
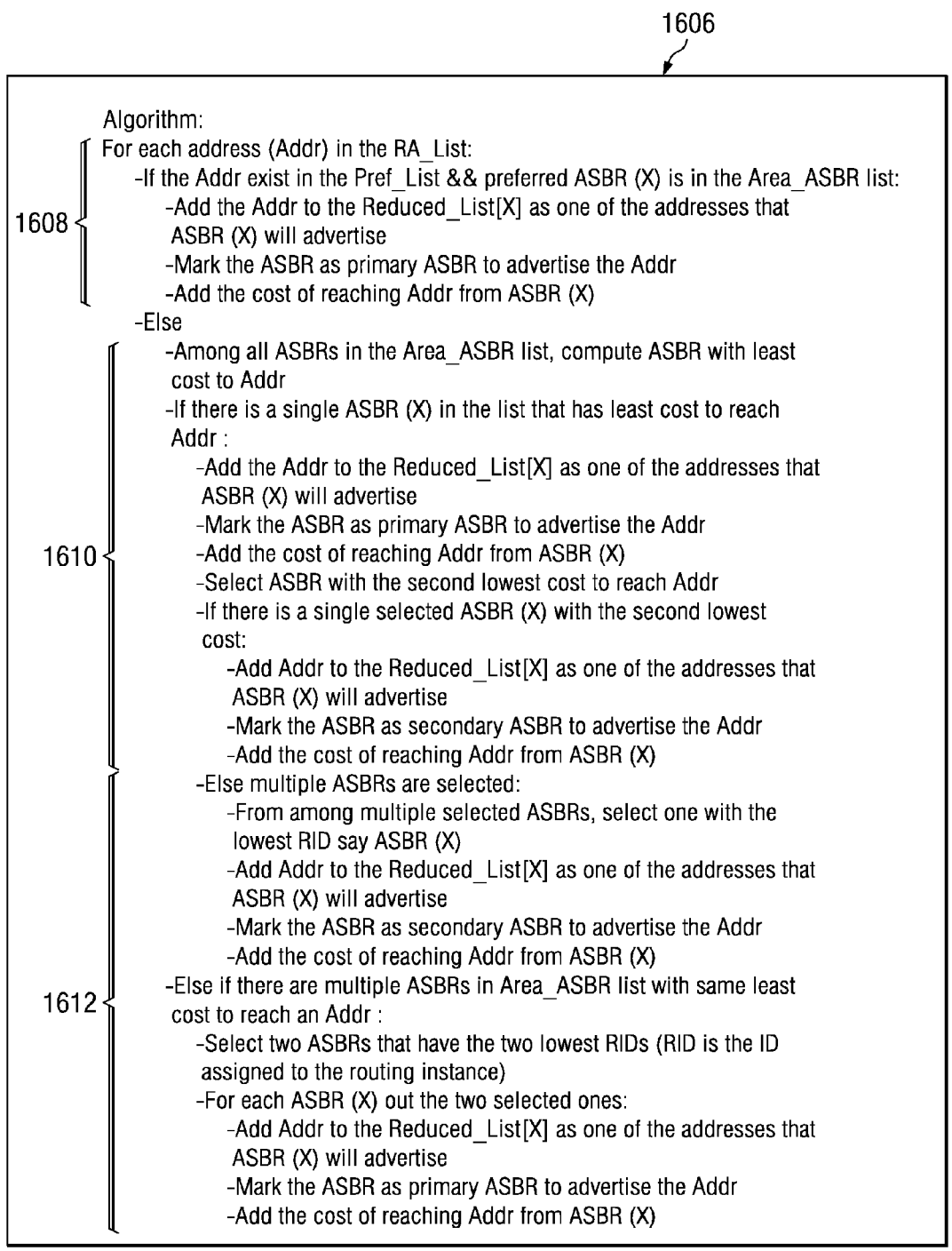
Figure 17A:
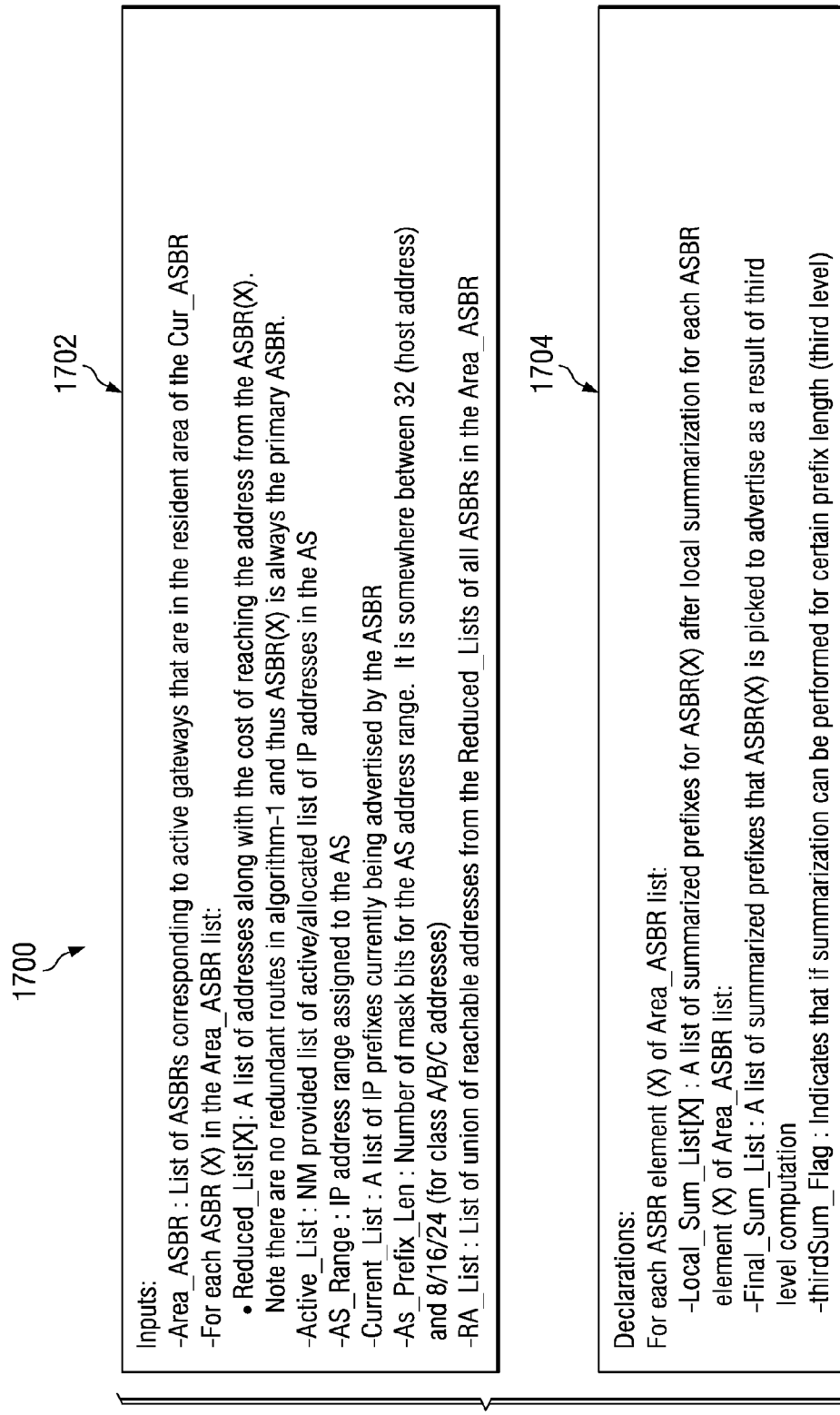

Turning now to FIGS. 16A-16C, are diagrams illustrating code for a process to select routes for a gateway is depicted in accordance with an advantageous embodiment. In this example, code 1600 contains inputs in section 1602. These inputs are data that is input into code 1600 to select routes. Section 1604 contains declarations for code 1600. Section 1606 illustrates instructions to select routes based on the inputs and declarations in section 1602 and section 1604. Subsection 1608 in section 1606 is employed to take into account preferences for particular gateways.

Subsection 1610 is used to identify a particular gateway having a lowest cost if no other gateways have the same lowest cost. Subsection 1612 in section 1606 is used to handle situations in which more than one gateway is present having a lowest cost to reach a particular address. Section 1614 in code 1600 identifies the output generated in response to selecting routes.

Turning now to FIGS. 17A-17D, are diagrams illustrating code for auto summarization is depicted in accordance with an advantageous embodiment. Code 1700 contains inputs in section 1702 and declarations in section 1704. The inputs in section 1702 are used to summarize or reduce the number of addresses presented by identifying prefixes for one or more addresses in these examples. Section 1706 in code 1700 is used to perform local summarization. In section 1706, the addresses are summarized for each gateway.

The result of section 1706 is used for further summarization horizontally across multiple nodes in subsequent sections of code 1700. Section 1708 contains code for selecting the best gateway to advertise a particular prefix for the network or autonomous system. This type of summarization is a second level of summarization, in these examples. Section 1710 is a third level of summarization, in these examples, and is used to identify the prefixes that may be used in addition to the prefix identified in the second level of summarization in section 1708 along with the best gateway to advertise these prefixes.

Section 1712 contains an identification of the output generated by code 1700 in sections 1706, 1708, and 1710. The output in section 1712 creates a final list of prefixes for the node on which the smart agent performs auto summarization, in these examples.

The different advantageous embodiments can take the form of an entirely hardware embodiment, an entirely software embodiment or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the invention in the form disclosed. Many modifications and variations will be apparent to those of ordinary skill in the art.

As an example, the different advantageous embodiments use link state information already gathered by other processes within the network. Other embodiments may be used in networks that do not already collect link state information. In these types of networks, processes may be added to generate and store link state information in the network. As another example, the summarization of addresses in a network is performed by a tactical network, for use by another network in the form of a satellite network, to route traffic to destinations in the tactical network. These processes may be applied to other types of networks, such as between two sub-networks in a network or to non-mobile networks.

Moreover, the different examples, in the depicted embodiments, are applied in each gateway on a distributed basis. In other embodiments, the processes may be performed centrally in a set of one or more gateways within the gateways, or in some other node other than a gateway. With this type of embodiment, the results or lists may be provided to each gateway for broadcast or sent to another network with an identification of gateways assigned to route traffic to particular destinations in the network in which the gateways are present. Further, different advantageous embodiments may provide different advantages as compared to other advantageous embodiments.

Although the different advantageous embodiments are illustrated as implementing a smart agent at each gateway, other embodiments may employ a centralized implementation in which a smart agent is located only in gateways within a backbone area, rather than other areas of a tactical network. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing addresses for a plurality of destinations in a network, the computer implemented method comprising:

summarizing addresses assigned to a plurality of gateways to form summarized addresses containing prefixes and addresses for the plurality of gateways in which each gateway in the plurality of gateways is associated with a portion of the prefixes and addresses for destinations handled by the each gateway in the plurality of gateways;

assigning a gateway in the plurality of gateways having a largest portion of the summarized addresses, a prefix for all addresses assigned to the network to form a selected gateway; and replacing an associated portion of the summarized addresses for the selected gateway with the prefix.

2. The computer implemented method of claim 1 further comprising:

assigning a particular gateway with a largest number of addresses covered by a selected prefix for a prefix size within a range of prefix sizes;

removing addresses assigned to the particular gateway that are covered by the selected prefix; and adding particular addresses assigned to other gateways in the plurality of gateways that are covered by the selected prefix, wherein the particular addresses are selected addresses removed from a previous summarization by another prefix having a different prefix size.

3. The computer implemented method of claim 2 further comprising:

repeating the steps of assigning the particular gateway with the largest number of addresses covered by the selected prefix for the prefix size within the range of prefix sizes;

removing addresses assigned to the particular gateway that are covered by the selected prefix;

and adding particular addresses assigned to other gateways in the plurality of gateways that are covered by the selected prefix, wherein the particular addresses are selected addresses removed from the previous summarization by another prefix having the different prefix size.

4. A computer implemented method for managing addresses, the computer implemented method comprising:

vertically summarizing the addresses dynamically for a plurality of gateways in a network while the network is active to form a set of prefixes and addresses;

horizontally summarizing the set of prefixes and addresses to form a summarized set of addresses; and sending the summarized set of addresses to another network, wherein the summarized set of addresses are used to select a gateway for use in directing traffic to a selected destination.

5. The computer implemented method of claim 4 further comprising:

selecting a gateway from the plurality of gateways using the summarized set of addresses to send traffic to a destination in a plurality of destinations.

6. The computer implemented method of claim 4, wherein the network is a tactical network and the another network is a satellite network and wherein the sending step comprises:
sending the summarized set of addresses from the tactical network to the satellite network for use in directing traffic to a plurality of destinations associated with the summarized set of addresses.

7. The computer implemented method of claim 4, wherein the network is a first sub-network within a larger network, and the another network is a second sub-network within the larger network providing access to the first sub-network to reach destinations in other sub-networks in the larger network and wherein the sending step comprises:
sending the summarized set of addresses from the first sub-network to the second sub-network for use in directing traffic to a plurality of destinations associated with the summarized set of addresses.

8. The computer implemented method of claim 4, wherein the sending step comprises:
sending a portion of the summarized set of addresses assigned to each gateway by the each gateway to the another network to send the summarized set of addresses to the another network.

9. The computer implemented method of claim 4, wherein the vertical summarizing step comprises:
successively summarizing Internet Protocol addresses of one network assigned to each gateway within the plurality of gateways dynamically for distribution into another network to create prefixes for a set of bits within a plurality of bits using the Internet Protocol addresses assigned to the each gateway.

10. The computer implemented method of claim 4, wherein the horizontal summarizing step comprises:
successively summarizing prefixes of one network assigned to a plurality of gateways dynamically to create prefixes with different prefix sizes for a set of bits within a plurality of bits using the prefixes and Internet Protocol addresses assigned to the plurality of gateways.

11. The computer implemented method of claim 4, wherein the horizontally summarizing step comprises:
assigning a gateway in the plurality of gateways a prefix for particular addresses assigned to the network.

12. The computer implemented method of claim 4 further comprising:
initiating the computer implemented method in response to an event.

13. The computer implemented method of claim 9, wherein the initiating step comprises:
initiating the computer implemented method in response to a change in a topology of the network.

14. The computer implemented method of claim 4 further comprising:
performing the step of vertically summarizing the addresses dynamically for the plurality of gateways in the network while the network is active to form the set of prefixes and the step of horizontally summarizing the set of prefixes and addresses to form the summarized set of addresses using link state information for the plurality of gateways.

15. The computer implemented method of claim 4, wherein an association of gateways in the plurality of gateways with the set of summarized addresses is present in the set of summarized addresses.

16. A computer program product for managing addresses for a plurality of destinations in a network, the computer program product comprising:
a non-transitory computer readable storage medium;
program code stored on the non-transitory computer readable storage medium for summarizing addresses assigned to a plurality of gateways to form summarized addresses containing prefixes and addresses for the plurality of gateways in which each gateway in the plurality of gateways is associated with a portion of the prefixes and addresses for destinations handled by the each gateway in the plurality of gateways;
program code stored on the non-transitory computer readable storage medium for assigning a gateway in the plurality of gateways having a largest portion of the summarized addresses, a prefix for all addresses assigned to the network to form a selected gateway; and
program code stored on the non-transitory computer readable storage medium for replacing an associated portion of the summarized addresses for the selected gateway with the prefix.

17. The computer program products of claim 16 further comprising:
program code stored on the non-transitory computer readable storage medium for assigning a particular gateway with a largest number of addresses covered by a selected prefix for a prefix size within a range of prefix sizes;
program code stored on the non-transitory computer readable storage medium for removing addresses assigned to the particular gateway that are covered by the selected prefix;
and program code stored on the non-transitory computer readable storage medium for adding particular addresses assigned to other gateways in the plurality of gateways that are covered by the selected prefix, wherein the particular addresses are selected addresses removed from a previous summarization by another prefix having a different prefix size.

18. A computer program product for managing addresses, the computer program product comprising:
non-transitory computer readable storage medium ;
program code stored on the non-transitory computer readable storage medium for vertically summarizing the addresses dynamically for a plurality of gateways in a network while the network is active to form a set of prefixes and addresses;
program code stored on the non-transitory computer readable storage medium for horizontally summarizing the set of prefixes and addresses to form a summarized set of addresses; and
program code stored on the non-transitory computer readable storage medium for sending the summarized set of addresses to another network, wherein the summarized set of addresses are used to select a gateway for use in directing traffic to a selected destination.

19. The computer program product of claim 18 further comprising:
program code stored on the non-transitory computer readable storage medium for selecting a gateway from the plurality of gateways using the summarized set of addresses to send traffic to a destination in a plurality of destinations.

20. The computer program product claim 18, wherein the network is a tactical network and the another network is a satellite network and wherein the program code stored on the non-transitory computer readable storage medium for sending the summarized set of addresses to another network, wherein the set of summarized addresses are used to select a gateway for use in directing traffic to the a selected destination, comprises:

program code stored on the non-transitory computer readable storage medium for sending the summarized set of addresses from the tactical network to the satellite network for use in directing traffic to a plurality of destinations associated with the summarized set of addresses.

21. The computer program product of claim 18, wherein the network is a first sub-network within a larger network, and the another network is a second sub-network within the larger network providing access to the first sub-network to reach destinations in other sub-networks in the larger network and wherein the program code stored on the non-transitory computer readable storage medium for sending the summarized set of addresses to another network, wherein the summarized set of addresses are used to select the gateway for use in directing traffic to the selected destination comprises:

program code stored on the non-transitory computer readable storage medium for sending the summarized set of addresses from the first sub-network to the second sub-network for use in directing traffic to a plurality of destinations associated with the summarized set of addresses.

22. A network data processing system comprising:
a plurality of destinations; and
a plurality of gateways, wherein the plurality of gateways vertically summarize addresses for the plurality of destinations dynamically for the plurality of gateways in a network within the network data processing system while the network is active to form a set of prefixes and addresses; horizontally summarize the set of prefixes and addresses to form a summarized set of addresses; and sending the summarized set of addresses to another network within the network data processing system, wherein the set of summarized addresses are used to select a gateway for use in directing traffic to the a selected destination.

23. The network data processing system of claim 22, wherein the network is a tactical network and wherein the another network is a satellite network.

24. The network data processing system of claim 22, wherein the plurality of gateways vertically summarize the addresses, horizontally summarize the set of prefixes and addresses, and send the summarized set of addresses to the another network in response to a change in a topology of the network.

25. The network data processing system of claim 22, wherein the plurality of destinations are a plurality of mobile nodes.

* * * * *